(12) United States Patent
Delgado et al.

(10) Patent No.: US 12,123,271 B2
(45) Date of Patent: Oct. 22, 2024

(54) DOWNHOLE TOOL

(71) Applicant: DSOLVE AS, Trondheim (NO)

(72) Inventors: Carlos J. Delgado, Trondheim (NO); Pål Viggo Hemmingsen, Trondheim (NO); Bjarne Bugten, Saksvik (NO); Marcus Fathi, Trondheim (NO); Astrid Bjørgum, Trondheim (NO); Nils-Inge Nilsen, Trondheim (NO)

(73) Assignee: DSOLVE AS, Trondheim (NO)

( * ) Notice: Subject to any disclaimer, the term of this patent is extended or adjusted under 35 U.S.C. 154(b) by 0 days.

(21) Appl. No.: 17/927,869

(22) PCT Filed: May 26, 2021

(86) PCT No.: PCT/NO2021/050135
§ 371 (c)(1),
(2) Date: Nov. 25, 2022

(87) PCT Pub. No.: WO2021/242115
PCT Pub. Date: Dec. 2, 2021

(65) Prior Publication Data
US 2023/0349255 A1    Nov. 2, 2023

Related U.S. Application Data

(63) Continuation of application No. 16/885,207, filed on May 27, 2020, now Pat. No. 11,193,345, which is a
(Continued)

(30) Foreign Application Priority Data

Sep. 29, 2016  (NO) .................................. 20161567

(51) Int. Cl.
*E21B 29/00* (2006.01)
*B23H 5/08* (2006.01)
(Continued)

(52) U.S. Cl.
CPC ............ *E21B 29/005* (2013.01); *B23H 5/08* (2013.01); *E21B 17/1021* (2013.01);
(Continued)

(58) Field of Classification Search
CPC . E21B 28/00; E21B 29/00–02; E21B 41/0085
See application file for complete search history.

(56) References Cited

U.S. PATENT DOCUMENTS

| 4,144,936 A | 3/1979 | Evans |
| 5,533,572 A | 7/1996 | Brady et al. |

(Continued)

FOREIGN PATENT DOCUMENTS

| EP | 0 227 456 A2 | 7/1987 |
| EP | 2 995 767 A1 | 3/2016 |

(Continued)

OTHER PUBLICATIONS

English language Abstract of RU 2227201 C2 (Apr. 20, 2004).
(Continued)

*Primary Examiner* — Giovanna Wright
*Assistant Examiner* — Ronald R Runyan
(74) *Attorney, Agent, or Firm* — Hershkovitz & Associates, PLLC; Abe Hershkovitz

(57) ABSTRACT

A downhole tool, for removing sections of metal tubing, said downhole tool comprising at least one conductive element being arranged to corrode a section of metal tubing using an electrolytic process, said conductive element being made of electric conductive material, an apparatus to establish a connection to the metal tubing, and a source of electrical power.

37 Claims, 10 Drawing Sheets

Related U.S. Application Data continuation-in-part of application No. 16/338,438, filed as application No. PCT/NO2017/050249 on Sep. 27, 2017, now Pat. No. 11,248,429.

(51) Int. Cl.

| | |
|---|---|
| *E21B 17/10* | (2006.01) |
| *E21B 28/00* | (2006.01) |
| *E21B 29/02* | (2006.01) |
| *E21B 41/00* | (2006.01) |

(52) U.S. Cl.
CPC .............. *E21B 28/00* (2013.01); *E21B 29/02* (2013.01); *E21B 41/0085* (2013.01)

(56) References Cited

U.S. PATENT DOCUMENTS

| | | | |
|---|---|---|---|
| 5,976,330 | A | 11/1999 | Ziegler et al. |
| 6,439,313 | B1 | 8/2002 | Thomeer et al. |
| 11,193,345 | B2 * | 12/2021 | Delgado ................ E21B 28/00 |
| 2012/0152543 | A1 | 6/2012 | Davis |
| 2013/0199785 | A1 | 8/2013 | Hekelaar |
| 2015/0101812 | A1 | 4/2015 | Bansal et al. |
| 2015/0267493 | A1 | 9/2015 | Schwartze |
| 2015/0328694 | A1 | 11/2015 | Hoop |
| 2016/0245032 | A1 | 8/2016 | Hekelaar |
| 2016/0251924 | A1 | 9/2016 | Porter |
| 2016/0251925 | A1 | 9/2016 | Porter |
| 2016/0273325 | A1 * | 9/2016 | Montaron ........... E21B 43/2405 |
| 2017/0241225 | A1 | 8/2017 | Grimsbo et al. |
| 2017/0260826 | A1 | 9/2017 | Crabeil et al. |
| 2018/0163477 | A1 | 6/2018 | Faircloth |
| 2021/0246748 | A1 | 8/2021 | Delgado |

FOREIGN PATENT DOCUMENTS

| | | | | |
|---|---|---|---|---|
| RU | 2227201 | C2 | 4/2004 | |
| RU | 2370625 | C1 | 10/2009 | |
| WO | WO 02/25050 | A2 | 3/2002 | |
| WO | WO 2012/170806 | A1 | 12/2012 | |
| WO | WO-2015199647 | A1 * | 12/2015 | ............... C25F 5/00 |
| WO | WO 2016/048157 | A1 | 3/2016 | |
| WO | WO 2018/063003 | A2 | 4/2018 | |

OTHER PUBLICATIONS

English language Abstract of RU 2370625 C1 (Oct. 20, 2009).
International Search Report in International Application No. PCT/NO2017/050249, mailed on Jun. 18, 2018.
International Preliminary Report on Patentability in International Application No. PCT/NO2017/050249, dated Dec. 10, 2018.
International Search Report in related International Application No. PCT/NO2021/050135, mailed on Sep. 13, 2021.
Written Opinion of the International Searching Authority in related International Application PCT/NO2021/050135, mailed on Sep. 13, 2021.
Office Action dated Jul. 19, 2021 in related U.S. Appl. No. 16/338,438, filed Mar. 29, 2019.
EPO Communication in corresponding European Application No. 17 801 517.8, dated Nov. 26, 2020.

* cited by examiner

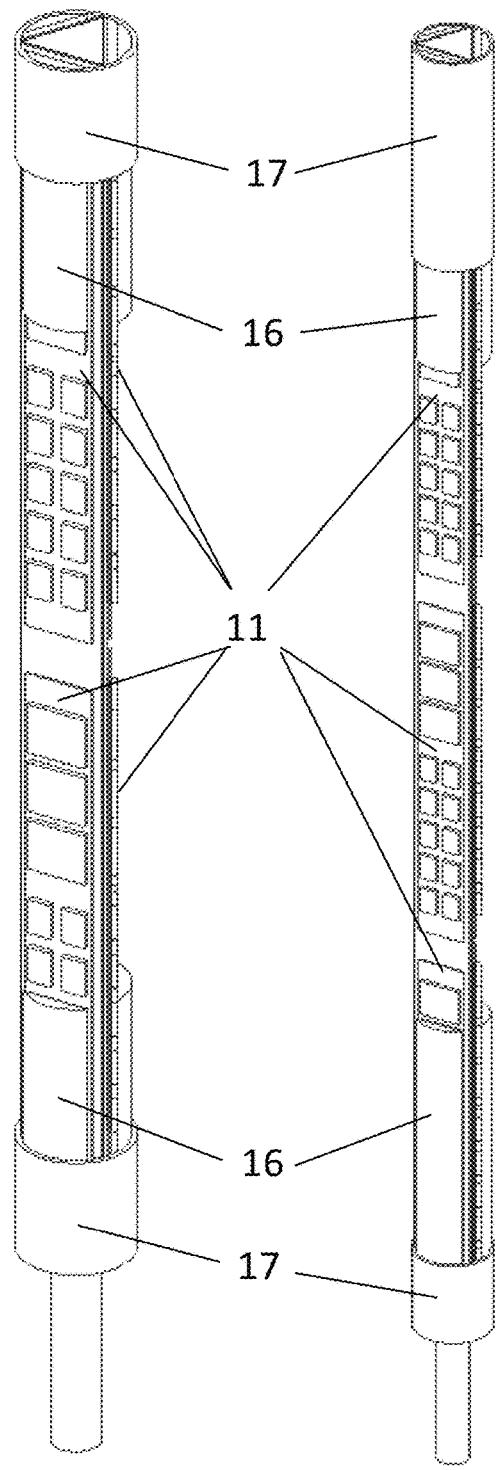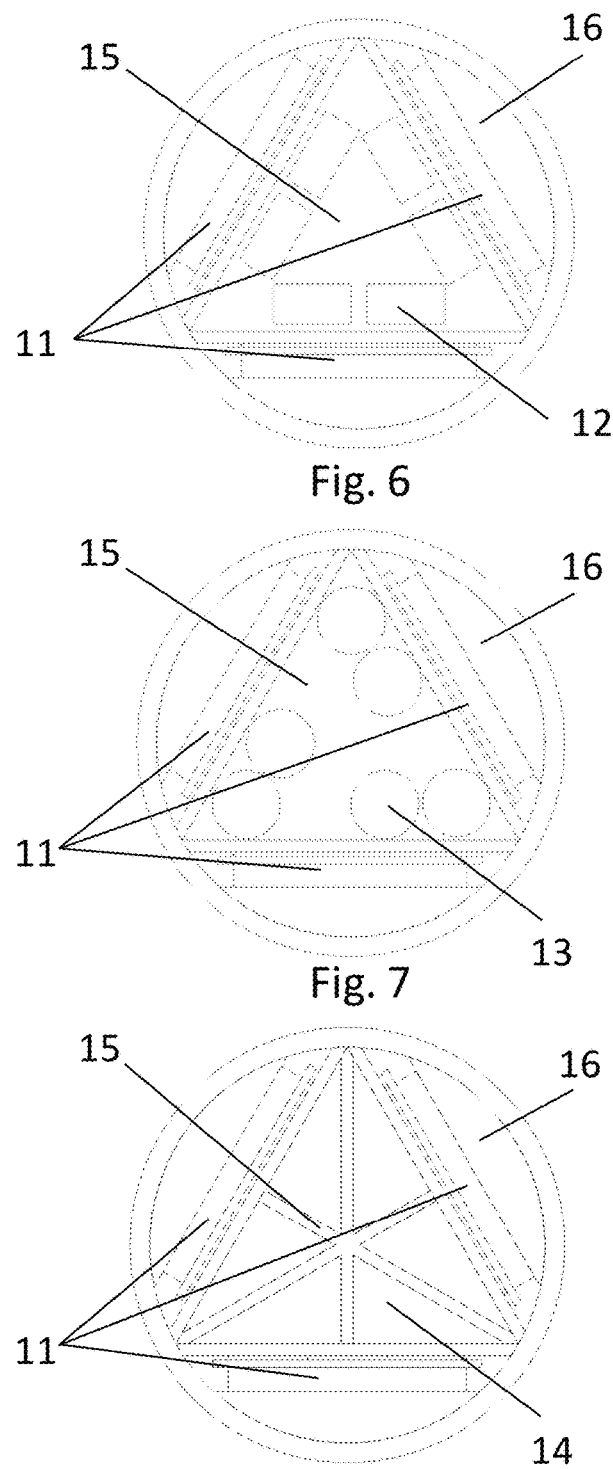

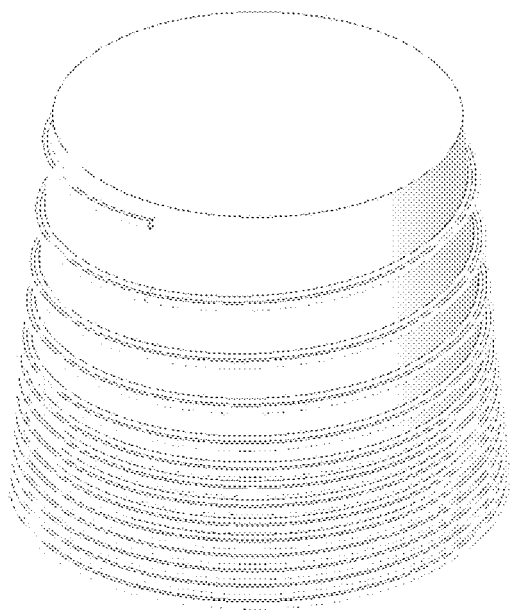
Fig. 13
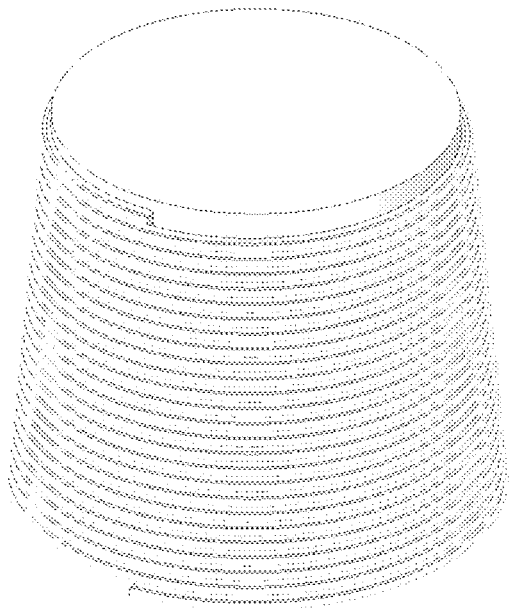
Fig. 14
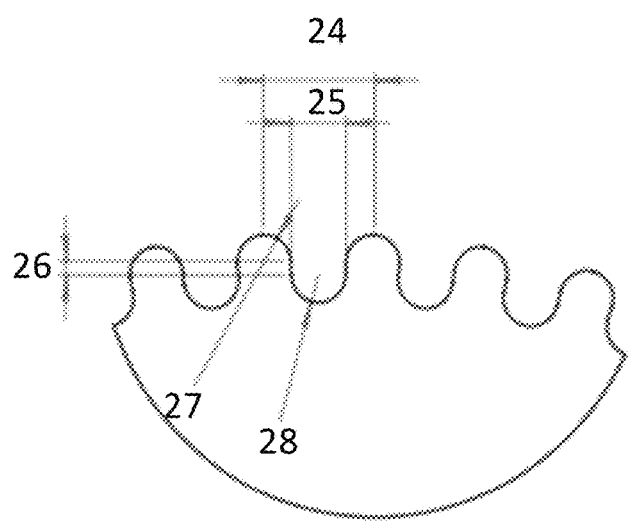 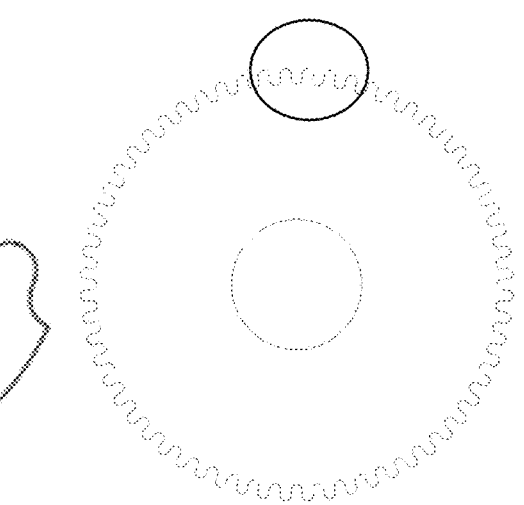
Fig. 15

DOWNHOLE TOOL

FIELD OF THE INVENTION

The present invention relates to a downhole tool to be used to corrode entire long sections of metal tubing in order to open a window in this metal tubing without the use of a drilling rig.

BACKGROUND OF THE INVENTION

Standards for well integrity in drilling and well operations require that when a well is to be permanently abandoned, barriers placed down the well to prevent leakage should extend across the full cross section of the well. The purpose of the cross-sectional plug or barrier is to guarantee the isolation of permeable formations, reservoirs and other sources of inflow.

This requirement is currently fulfilled by cutting and pulling the tubing and casing in a region of the well followed by setting a cement plug, which can then extend from the formation at one side to the formation at the other side of the borehole. This operation can be problematic in that the casing string may become stuck due to the settling of particles. Multiple cut and pull operations may be necessary to remove the casings. Traditionally, cutting and pulling of the casing is done using a rig.

Performing this operation can therefore be time consuming, expensive and can produce a considerable amount of $CO_2$, especially in subsea wells.

In order to reduce the considerable environmental footprint and the high costs related to the permanent P&A operations, the service industry has been challenged to find alternative ways to open a cross-sectional window in the casing, and to set and verify permanent cross-sectional barriers in the well without the use of a rig.

The invention offers a novel method for opening the cross-sectional window in the casing without the use of a rig by using electrical power to accelerate the dissolution or corrosion of long sections of the metal casing or tubing.

The method described herein is based on use of an electrical current to stimulate a non-spontaneous reaction in the metal tubing in order to transform the tubing material into its original condition. This process is performed using an electrochemical cell which comprises an external power supply, a conductive solution or electrolyte and two electrodes (anode and cathode). The cathode is part of the invented downhole tool, which can be operated and powered from the surface through a wireline or from a downhole hydro-electrical power supply or from a downhole battery. The electrolyte is an electrically conductive solution and may comprise water or brine already present in the well (a solution with a high-concentration of salt). The anode is the metal tubing in which it is desired to open a window.

DISCLOSURE OF THE STATE OF THE ART

U.S. Pat. No. 4,144,936 A describes an apparatus for milling metal or cutting off the upper ends of pipes and casings in drilling operation or in abandoning and plugging of a well. The tool is to cut through the pipes and casings using electrochemical machining or grinding. It includes radially movable, electrically conductive elements, which form the cathodes of an electrochemical machining operation for removing metal. The tool element further includes an abrasive material (cutting element) so that they can mechanically cut or mill through the cement layers between casings. An electric current is applied through the tool and adjacent pipe or casing and salt water is circulated around the tool and inner wall of the casing and serves as an electrolyte.

The subject matter of the invention differs from the disclosure of U.S. Pat. No. 4,144,936 A in that the invention corrodes entire long sections of pipes and casing using a downhole tool that is powered either by a downhole power source such as a battery or is connected to the surface through a wire. In contrast, the system described in U.S. Pat. No. 4,144,936 A achieves a cut through the casing using a downhole apparatus powered and connected to the surface through a hollow drill string. It is also necessary to later use a drilling rig to pull this casing. By corroding entire long sections of casing using the downhole tool described herein, there is no need to pull this casing in order to meet the requirements for plugging and abandonment of an oil & gas wells. Therefore, the invention allows a window to be opened in the casing without using a rig, substantially reducing the cost and $CO_2$ emissions compared to rig-based methods.

WO 2012/170806 A1 discloses a dual string section-milling tool, which includes a cutting block deployed in a single trip in an axial recess in a tool body. The cutting block is configured to extend radially outward from and retract radially inward towards the tool body. The cutting block is further configured to remove a cement layer in a wellbore. The milling tool is deployed on a tool string and rotated in the well bore such that the blades make a circumferential cut in the metallic casing string. The tool string is then urged downhole while rotation continues so as to axially mill the casing string to the desired length.

US 2015/101812 A1 discloses a dual casing window mill for use in a wellbore includes a tubular housing and a plurality of eccentrically arranged pockets formed in a wall thereof and an arm disposed in each pocket. Each arm has a body portion and a blade portion extending from an outer surface of the body portion and is movable between an extended position and a retracted position. The mill further includes cutters disposed along each blade portion and a block disposed in each pocket and connected to the housing. The mill further includes an actuator for extending the arms towards the casings.

The subject matter of the invention differs from the disclosure of WO 2012/170806 A and US 2015/101812 A1 in that the invention uses electrolysis as the main method to corrode the metal casing or tubing.

WO 2016/048157 A1 discloses two electrochemical methods to remove iron-containing casing from a wellbore as part of a plugging and abandonment procedure. The first method uses the exterior surface of a conductive fluid line as a cathode. The fluid line is connected to an electrical current supply and a tank containing electrolyte located at the surface. The fluid line is placed between two temporary plugs. These plugs are placed on top and bottom of the interval from which the iron-containing casing is to be removed. A conductive electrolyte is then pumped through the fluid line while very high electrical currents from the surface are applied to this fluid line. The electrolytic process will occur in the interval containing electrolyte between the two plugs, resulting in the iron-containing casing between the two plugs being removed.

The second method also uses the exterior surface of a conductive fluid line as a cathode, through which very high electrical currents are applied from the surface. In this second method, the fluid line is partially electrically conductive and partially insulated with a non-conductive coating. The electrically conductive section of the fluid line is placed adjacent to the iron-containing casing to be removed.

The subject matter of the invention differs from the disclosure of WO 2016/048157 A1 in that the invention does not corrodes entire long sections of pipes and casing using a downhole tool that is powered and connected to the surface through a wire. The downhole tool may contain a power unit that allows electrical current to the cathode to be transferred through a very conductive wire in the form of high voltage/ low current to be later converted into high current/low voltage. This is much more efficient that providing high current directly to a long fluid line or pipe in which case much of the electrical current will be dissipated in the form of heat before it reaches the section comprising the cathode.

Another difference is that while the system described in WO 2016/048157 A1 uses heavy fluid lines as cathodes needing a rig or at least a coil tubing unit to be operated, the invented downhole tool can be operated with wireline equipment, making it more efficient and environmentally friendly and enabling a plugging and abandonment operation to be completed without a rig.

The downhole tool described herein is able to guarantee a bottom to top casing removal as well as centralisation of the cathode. Where parts of the casing closer to the top of the wellbore are dissolved first this can result in portions of the casing becoming electrically isolated such that they will not continue to dissolve, so a bottom to top removal of the casing is advantageous as is a centralised cathode resulting in even dissolution of the casing in a radial direction.

Novel methods for optimising the power consumption during the electrolysis (such as by using different cathode surface shapes) are described herein. No such descriptions are disclosed in WO 2016/048157 A1.

According to a first aspect of the present invention, there is provided a downhole tool for removing sections of metal tubing, said downhole tool comprising: one or more conductive elements arranged to corrode a section of metal tubing using an electrolytic process, said one or more conductive elements being formed of electrically conductive material, an apparatus to establish a connection between the one or more conductive elements and the metal tubing, and a power unit configured to provide an electrical current to the one or more conductive elements. The power unit may be configured to transport or relay current from the surface or from a battery to the conductive elements, and in some examples may convert the current supplied as described in more detail below.

In embodiments, the one or more conductive elements are made of electrically conductive material such as steel, stainless steel, aluminum, copper, titanium, graphite, nickel or other alloy or coating that reduces the overpotential between the conductive elements and an electrolyte.

In embodiments, the at least one main conductive element is centrally placed in the tool.

In embodiments, several conductive elements are coupled to the power unit and these conductive elements are mounted on expandable rails configured to move them closer to or towards and away from the metal tubing. In embodiments, several conductive elements are coupled to the power unit and these conductive elements are mounted on expandable rails configured to move them in a direction perpendicular to the longitudinal axis of the metal tubing.

In embodiments, the surface of the one or more conductive elements is shaped with patterns of indents or grooves.

In embodiments, the surface of the one or more conductive elements comprises longitudinal grooves or helical grooves or combinations thereof.

In embodiments, the size of the surface area of the conductive element is between 0.8 and 4 times the internal surface area of the metal tubing.

In embodiments, the tool comprises one or more non-conductive spacers which are configured to sit against the internal surface of the metal tubing during the corrosion process, and wherein at least a portion of the tool is configured to rotate such that the spacers move against the surface of the tubing.

In embodiments, the one or more conductive elements comprise the non-conductive spacers.

In embodiments, the non-conductive spacers provide a 0.05 mm to 30 mm gap between the one or more conductive elements and the metal tubing.

In embodiments, the at least a portion of the tool is configured to rotate back and forth in an oscillating motion.

In embodiments, the conductive elements are designed to overlap with each other or contain additional conductive elements that reduce the surface gap caused by the expandable rails moving closer to the metal tubing, which may be by the expandable rails moving perpendicular to the longitudinal axis of the metal tubing.

In embodiments, the power unit is configured to convert a low current/high voltage input from a power source into a high current/low voltage output for provision to the conductive elements.

In embodiments, said output electrical current is DC or pulsating current and can contain high levels of electrical noise.

In embodiments, the input to and the output of the power unit are electrically isolated from each other.

In embodiments, the input to the power unit is between 400 and 3,000 volts and the output electrical current from the power unit is between 0 and 15,000 Amps.

In embodiments, the power unit comprises one or more power modules which are connected to the one or more conductive elements through the same common conductors.

In embodiments, the power unit comprises more than one power modules and the tool comprises more than one conductive element, and each of the power modules are connected independently to a different one of the conductive elements.

In embodiments, the power unit comprises one or more power modules and conductors connecting the power modules to the conductive elements are placed inside the main chassis of the downhole tool.

In embodiments, the conductive element, or a compound element comprising more than one conductive element, has a smaller diameter at an upper end and a larger diameter at a lower end.

In embodiments, the conductive element or a compound element comprising more than one conductive element has a circular truncated conical shape.

In embodiments, the conductive elements can move closer to the metal tubing. In embodiments, the conductive elements can move in a direction perpendicular to the longitudinal axis of the wellbore, independently from each other.

In embodiments, the conductive elements can move closer to the metal tubing to form a frustoconical compound conductive element and the end of said frustoconical compound conductive element with the smaller radius is the closest to the apparatus to establish a connection to the metal tubing. In embodiments, the conductive elements can move in a direction perpendicular to the longitudinal axis of the wellbore to form a frustoconical compound conductive element and the end of said frustoconical compound conductive element with the smaller radius is the closest to the apparatus to establish a connection to the metal tubing.

In embodiments, the one or more conductive elements are configured to rotate continuously.

In embodiments, the one or more conductive elements are configured to rotate back and forth in an oscillating motion.

In embodiments, the conductive elements are shaped to avoid sharp edges, and wherein the grooves formed on the surface of the conductive elements have a sinusoidal cross-sectional profile.

In embodiments, the downhole tool is submerged in an electrolyte having a salt concentration between 2 to 30 wt %.

In embodiments, the tool comprises a device configured to obtain measurements of the current output from the power unit, and the measurements are usable to monitor the corrosion of the metal tubing.

In embodiments, the tool is configured to be moved during the corrosion process from a deeper position to a shallower position in the well.

In embodiments, the one or more conductive elements each comprise non-conductive spacers providing a 0.05 mm to 30 mm gap between the conductive element and the metal tubing.

In embodiments, the tool comprises components for driving circulation of the fluid around the conductive elements and the power unit.

In embodiments, the components are integral with the conductive elements.

In embodiments, the components for driving the circulation of the fluid are made of non-conductive abrasive material and are used as abrasive or milling elements, said abrasive elements being shaped to drive the circulation of fluid.

In embodiments, the tool further comprises at least one apparatus to provide vibration to the conductive element.

In embodiments, the tool comprises at least one clamping module comprising a mechanical, hydraulic, or electromagnetic device to anchor and centralize the downhole tool and conductive elements within and to the metal tubing.

In embodiments, the tool further comprises a logging sensor to log properties from the formation, cement, metal tubing, and the environment around the tool.

In embodiments, the tool further comprises a milling apparatus to clean material deposited in the surface of the casing and cement behind said casing.

In embodiments, the downhole tool comprises a mechanism configured to detach the conductive elements from the downhole tool in response to a user input.

In embodiments, the downhole tool comprises an apparatus configured to measure the progress of the corrosion process located at or adjacent the bottom edge of the conductive elements, providing measurements of the thickness of the metal tube at a height that is located between a height of 100 mm above the bottom end of conductive element to a height of 100 mm below the bottom end of conductive element.

In embodiments, the power unit is provided with power by means of a wire coupled to a surface power source or by a downhole battery or a downhole power generator.

In embodiments, the downhole tool comprises sensing means configured to measure the progress of the corrosion process, the sensing means being located at or adjacent the bottom end of the one or more conductive elements.

In embodiments, the sensing means are mechanical means comprising one or more protrusions which are movable towards the metal casing and biased in an outward direction, such that they sit against the section of metal casing that is being corroded.

In embodiments, the sensing means comprises an ultrasound emitter and detector.

In embodiments, the sensing means are located between 1000 mm above the bottom end of the one or more conductive elements and 1000 mm below the bottom end of the conductive element, more preferably between 500 mm above the bottom edge or end of the conductive element and 500 mm below the bottom end of the conductive element, and most preferably between 100 mm above the bottom end of conductive element and 100 mm below the bottom end of conductive element. The bottom end refers to the bottom edge of the conductive element. If this is not located at the same height all of the way around, then the bottom end refers to the lowest point of the bottom edge of the conductive element when located within the well.

According to a second aspect of the present invention, there is provided a method for cutting through a section of metal casing in a wellbore using a downhole tool, the tool comprising one or more conductive elements, the method comprising: locating the downhole tool within and adjacent a section of the casing; electrically coupling the one or more conductive elements to the metal casing and providing an electrical current to the one or more conductive elements such that the metal casing is electrochemically corroded; using a sensor of the tool to determine that the casing has been completely corroded away along at least a portion of the length of the section of casing; in response to sensing that a portion of the casing has been corroded away, moving the tool further up the wellbore to a position adjacent a new section of the casing. The new section of casing may overlap with the original section of casing.

In embodiments, the method may comprise anchoring the tool in the first location adjacent the first section of casing, and in response to sensing that a portion of the first section of casing has been completely eroded away releasing the anchor and reengaging the anchor to fix the tool adjacent the new section of casing.

In embodiments the method comprises sensing that a lower portion of the casing section has been completely corroded away. In embodiments, the method comprises locating the tool such that the conductive elements are closest to the internal surface of the casing at a downhole end.

In embodiments, the method comprises locating the tool such that the one or more conductive elements is centred within the casing and aligned with a longitudinal axis of the casing section, and the conductive element or conductive elements together have a larger diameter at a downhole end such that the downhole end of the casing section is corroded faster than the upper end. Upper and lower are described herein relative to the wellbore (up being a direction towards the surface or the direction that the wellbore needs to be followed in order to reach the surface) and to the tool as it is orientated when located within the wellbore.

In embodiments, the sensing means are mechanical means comprising one or more protrusions which are movable towards the metal casing, which may represent movement in a direction perpendicular to the longitudinal axis of the casing section and/or of the tool and biased in an outward direction such that they sit against the section of metal casing that is being corroded. How far they are able to protrude or move outwards therefore provides information about how thin the section of casing has become, or how much of the casing has been corroded away. The protrusions may be spaced around the lower circumference of the conductive element or elements and may be biases outwards using one or more springs.

In embodiments, the sensing means comprises an ultrasound emitter and detector. A distance to the casing can be determined via an echo which will inform as to how thin the casing is and how much has been corroded away.

In embodiments, the sensor is located at or adjacent the bottom edge of the one or more conductive elements. This way when the lower portion is being corroded away faster this is detected, and by moving the tool incrementally up the wellbore bottom to top corrosion can be achieved.

According to a third aspect of the present invention, there is provided a downhole tool for removing sections of metal tubing comprising: one or more electrically conductive elements configured to corrode a section of the metal tubing using an electrolytic process; and a power unit configured to receive a high voltage, lower current input and to convert this to a high current, low voltage output for provision to the one or more conductive elements.

In embodiments, the high voltage, lower current input power is transported from the surface via a wireline.

According to a fourth aspect of the present invention, there is provided a downhole tool for removing sections of metal tubing comprising: one or more electrically conductive elements configured to corrode a section of the metal tubing using an electrolytic process; and a power unit configured to provide power to the one or more conductive elements, wherein the conductive elements have an outer surface that comprises a shaped surface having a smooth cross-sectional profile. In embodiments, the shaped surface may comprise one or more grooves.

This additional surface structure increases the surface area of the conductive elements, reducing current density and thus also the power usage. Use of a smooth cross-sectional profile means that sharp regions, which may become regions of high current density in use, are avoided. Smooth refers to the fact that there are no abrupt changes in angle of the surface, and changes in the surface profile happen gradually (or are continuous) as you move along the surface.

In embodiments, the shaped surface comprises one or more grooves and the cross-sectional profile of the one or more grooves is sinusoidal. In embodiments, the grooves form troughs and peaks on the surface. In an embodiment where troughs and peak are present, the troughs and peaks may each have a semicircular cross-sectional profile.

According to a fifth aspect of the present invention, there is provided a downhole tool for removing sections of metal tubing comprising: at least two electrically conductive elements configured to corrode a section of the metal tubing using an electrolytic process; and a power unit configured to provide power to the one or more conductive elements, wherein the conductive elements are movable in a direction perpendicular to the longitudinal axis of the section of tubing when the tool is in place and the tool comprises a conductive linking section between each of the one or more pairs of adjacent conductive elements, such that when the conductive elements move radially any gap between adjacent conductive elements is bridged by the linking section.

In embodiments, the linking section or sections comprises a mesh formed from a plurality of linked conductive elements. The mesh may have a structure similar to that of chain-mail. In embodiments, the linking section comprises a thinner portion of one of the conductive elements which sits under an adjacent conductive element when the conductive elements are moved radially inwards, such that adjacent elements are overlapping.

According to a sixth aspect of the present invention, there is provided a downhole tool for removing sections of electrically conductive tubing comprising: one or more electrically conductive elements configured to corrode a section of the metal tubing using an electrolytic process; and a power unit configured to provide power to the one or more conductive elements, wherein the tool comprises one or more non-conductive spacers which are configured to sit against the internal surface of the metal tubing during the corrosion process, and wherein at least a portion of the tool is configured to rotate such that the spacers move against the surface of the tubing. The spacers may move against the surface of the tubing to dislodge any reaction products which are deposited thereon. The electrically conductive tubing may be completely or partially formed from metal.

In embodiments, the spacers are coupled to the one or more conductive elements to ensure a minimum gap between the conductive elements and the metal tubing and the one or more conductive elements is configured to rotate. The conductive elements may rotate back and forth.

In embodiments, the at least a portion of the tool is configured to rotate back and forth in an oscillating motion.

According to a seventh aspect of the present invention, there is provided a downhole tool for removing sections of metal tubing, said downhole tool comprising: one or more conductive elements arranged to corrode a section of metal tubing using an electrolytic process, said one or more conductive elements being formed of electrically conductive material; an apparatus to establish a connection between the one or more conductive elements and the metal tubing; and one or more components for driving circulation of the fluid around the conductive elements and the power unit. The components may comprise angled fins which push the fluid in a direction parallel with the housing of the tool and the wellbore when they rotate.

In embodiments, the components are stand-alone components shaped to drive the circulation of the fluid.

In embodiments, the components are integral with the conductive elements.

In embodiments, the components for driving the circulation of the fluid are made of non-conductive abrasive material and are used as abrasive or milling elements, said abrasive elements being shaped to drive the circulation of fluid.

SUMMARY OF THE PRESENT INVENTION

Described herein is a downhole tool designed to remove single or multiple long sections of metal tubing in a well bore. The downhole tool can be operated from the surface or also operated through a control unit located in the subsea installation so that a vessel will only be needed for installation and recovery of the tool. The invention involves applying an electrical current to electrically conductive elements or cathodes whilst they are submerged in a conductive brine in order to corrode a surrounding metal tubing. The conductive elements may have a shaped or patterned surface in order to increase the surface area of the cathode, which will decrease the current density and power consumption. The shaped surface may comprise one or a series of grooves formed in the surface. Generally, a reduction in power consumption is desirable along with a high current which will increase the speed with which sections of the pipe can be completely corroded. The shaped conductive elements may also be attached to expanding rails that can be activated to position the conductive elements close to the metal tubing to be dissolved. A shorter distance between the conductive elements and the metal tubing will results in a further reduction in power consumption.

The shape of the conductive elements can also be such that the removal of the entire section of metal tubing is guaranteed. This is achieved by using conductive elements with a substantially conical shape. The area of metal tubing closer to the conductive element will be removed faster than areas with longer distances in between. A conical shaped cathode, with the larger diameter region located downhole, will therefore result in lower region of the pipe being corroded away faster.

The cathode may be frustoconical or may be stepped such that different diameter regions are provided along the length of the cathode, with the largest diameter region located downhole and the smallest diameter region at the top.

The length of the section of casing which can be removed is partly dependent on the size of the conductive elements (although these can be moved progressively up the well to corrode a longer portion of the casing). The size of the conductive elements may vary from several centimetres to several meters.

The high levels of electrical current necessary to efficiently corrode the metal tubing can be provided to the conductive elements directly through a high current capacity cable connected to the surface. A high voltage/low current AC or DC (preferably DC) input may be provided to a power unit of the tool from the surface through a wireline and this may be converted by the power unit to a high current/low voltage DC output for transfer to the conductive element of the tool. Said required electrical currents are generally DC or pulsating currents and can contain high levels of electrical noise.

The invention relates to a wireline or coil tubing tool that is designed to open windows in casing or other tubing in wells that will be plugged and abandoned without the need of a rig.

The invention can also be used to open the metal tubing for reasons other than plugging and abandonment, for example for side-tracking operations with coil tubing, conventional drilling by corroding oriented sections of the tubing, or for slot recovery operations.

The above objects are achieved using a downhole tool for removing sections of metal tubing, comprising at least a power unit that can be placed at surface or downhole to provide the electrical current, at least one conductive element being arranged to corrode a section of metal tubing using an electrolytic process, said conductive element in an example being a tube, pipe, a plate or a combination thereof which is made of an electrically conductive material and is shaped to optimize power consumption and control the acceleration of corrosion at different positions of the metal tubing, and an apparatus to establish an electrical connection between the downhole tool and the metal tubing.

The downhole tool described herein can be placed in a well filled with a conductive brine or electrolyte that will provide the electrical connection between the conductive element and the section of metal tubing to be corroded. In some cases, no additional electrolyte solution needs to be provided.

The conductive elements of the downhole tool can be made from any electrically conductive material such as steel, stainless steel, aluminum, copper, titanium, graphite, nickel or other alloy or coating that reduces the overpotential between the conductive elements and the electrolyte. The conductive elements can be shaped to control the acceleration of corrosion at different positions of the metal tubing and in particular to optimize the ratio between the metal tubing and the conductive element surface areas. Shaping the surface of the conductive element or cathode can also reduce the power consumption of the tool by increasing the surface area of the cathode and therefore reducing the current density. Another method to reduce the power consumption is to reduce the distance between the conductive elements and the metal tubing and therefore reducing the amount of electrolyte between the conductive elements and metal tubing. The conductive elements may comprise longitudinal grooves, helical grooves, or a combination thereof. Both configurations will increase the surface area of the conductive element or cathode in comparison with a smooth cylindrical surface, for example.

If the downhole tool has one conductive element, it can be centrally placed on the main shaft of the tool. If the downhole tool configuration comprises several conductive elements, these may be attached to the main source of electrical current through expandable rails, to allow the conductive elements to be adjusted to an optimal separation from metal tubing of different sizes.

The downhole tool will be designed to pass through the components with the smallest IDs (Internal Diameters) likely to be present in a well. As the component with the minimum ID might be other than the targeted metal tubing, the downhole tool and especially the conductive elements may have an OD (Outside Diameter) which is smaller or considerably smaller than the ID of the metal tubing. This will affect the amount of electrolyte between the conductive elements and the metal tubing, increasing the power consumption. By reducing the distance between the conductive elements and the metal tubing (for example by mounting the conductive element or elements on expandable rails) the amount of electrolyte is also reduced, therefore decreasing the power consumption.

The conductive elements are fitted with non-conductive spacers that keep the conductive elements from having a direct contact with the metal tubing and therefore causing a short circuit.

The downhole tool is preferably powered from the surface through a cable, although it can also be powered by a downhole hydro-electrical power supply.

When powering the downhole tool though a cable, the high electrical current can be provided directly from the surface power unit to the conductive elements through a high current capacity cable or by supplying a high voltage/low current from surface through a wireline and converting the electrical power to a low voltage/high current DC output by a downhole power unit. Said output electrical currents are preferably DC or pulsating currents and can contain high levels of electrical noise. Said electrical power input can be AC or DC.

The electrical circuit will be completed by the electrolyte or conductive brine and by the connector between the downhole tool and the metal tubing. The negative pole of the power unit will be connected to the conductive element or elements, while the positive pole of the power unit will be connected to the metal tubing through the connector to metal tubing module.

The connector to metal tubing will be able to conduct the currents provided by the power unit. This may be achieved by using several expandable connectors that will physically connect the metal tubing to the downhole tool. These connectors can be made from highly conductive materials and will be designed to eliminate any electrical welding between the connectors and the metal tubing. The design may include use of materials such as silver and the connectors may be of different shapes in order to increase the surface area of the connector.

The connector to the metal tubing may also be fitted with a release mechanism that is operable to retract the connectors should the tool fail.

The downhole tool can contain at least one clamping module comprising a mechanical, hydraulic, or electromagnetic device to anchor and centralize the downhole tool. This can also be fitted with a release mechanism that is operable to disconnect (for example by retracting) the connectors should the tool fail.

The downhole tool may further comprise a coupling system for connection, communication, and automated control of additional equipment to which the downhole tool is connected. The additional equipment may include downhole tractors, which would allow for placing the downhole tool at the desired depth.

The downhole tool may further comprise an apparatus which is operable to provide vibration to the conductive element and other sensors (such as annular pressure sensors or any suitable logging module containing sensors to log formation properties) and the environment around the tool.

The downhole tool may further comprise a communication unit which provides attachment to a wire and connects the tool to a subsea installation or surface.

The downhole tool may further comprise a residue catcher which may comprise a basket and a magnet operable to recover solid metallic residues.

The downhole tool may also comprise components to drive the circulation of the fluid around the conductive elements.

The downhole tool may further comprise a milling module which is operable to clean the casing surface as well as the cement behind the dissolved casing.

DESCRIPTION OF THE FIGURES

Embodiments of the present invention will now be described, by way of example only, with reference to the following figures, wherein:

FIG. 4 shows a diagram of a power unit.

FIG. 5 shows a diagram of a power unit with additional power modules.

FIG. 6 to 8 show different power unit configurations to connect the power modules.

FIG. 10 to 18 show possible shapes and features of conductive elements.

DESCRIPTION OF PREFERRED EMBODIMENTS OF THE INVENTION

Figure 1:
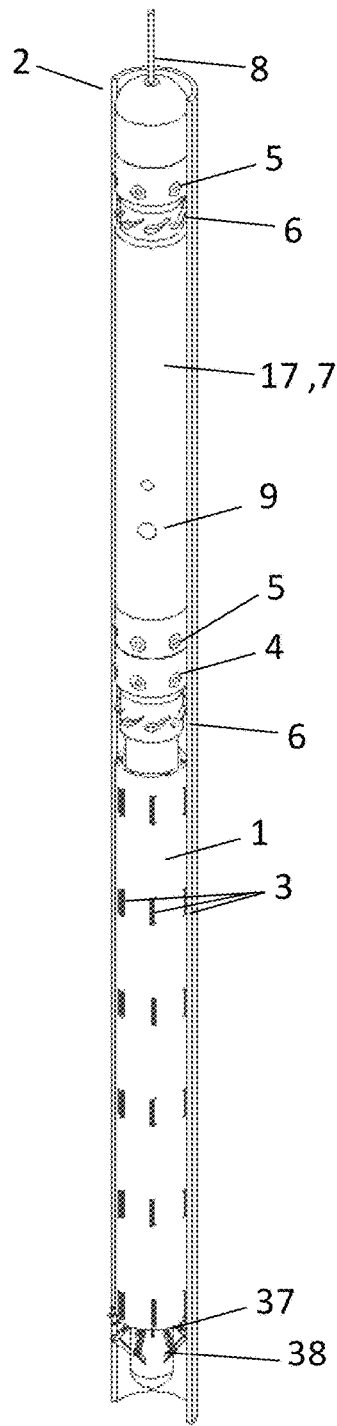
FIG. 1 shows one embodiment of the wireline downhole tool according to the invention with one centrally place conductive element and two clamping elements.
Figure 2:
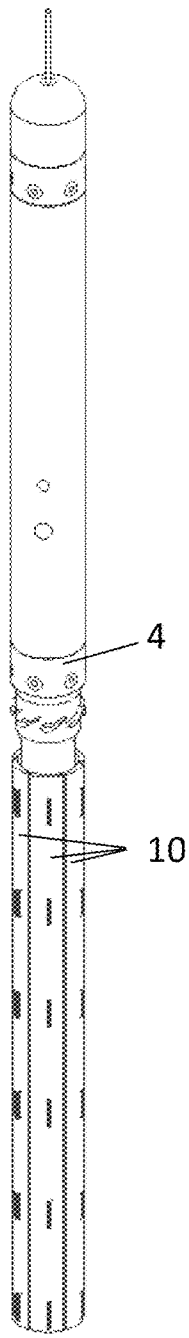
FIG. 2 shows another embodiment of a milling tool according to the invention with several conductive elements in a closed position, one clamping element and the connector to the metal tubing also used as clamping.
Figure 3:
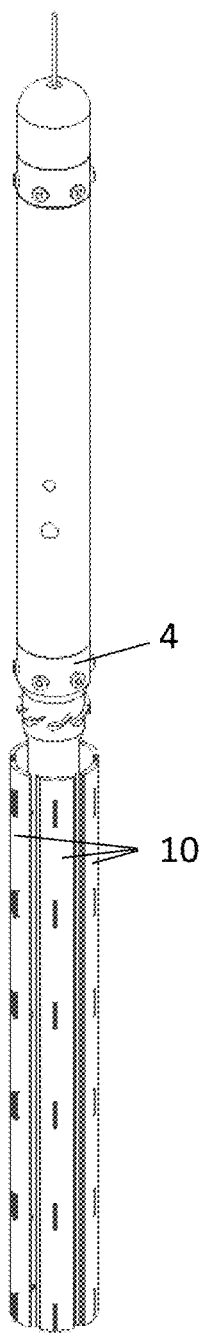
FIG. 3 shows another embodiment of a milling tool according to the invention with several conductive elements in an extended position in order to reduce the distance between the conductive elements and the metal tubing.

As seen in FIGS. 1, 2, and 3, the downhole tool comprises several components. In FIG. 1, the tool is shown inserted in a metal tubing 2 of a wellbore, which contains a conductive brine. The tool comprises a connection 8 to the surface, for instance a wire. Clamping elements 5 may be equipped with expandable parts that can apply a force on the inside of the metal tubing 2 in order to hold in place and centralize the tool. An enclosure 17 is provided, which may contain a power unit 7 for converting the electrical power delivered from a surface power supply (not shown) into the required electrical current to be delivered to the conductive elements 1,10 and other components. The enclosure 17 may also contain downhole batteries to provide power or an alternative source of electrical power to the downhole tool and conductive elements 1,10 and many of the additional components which may be required to operate the downhole tool. Among many other functions, these additional components may be used to establish communication with the downhole tool, provide downhole hydraulic power, acquire data, control the downhole systems, and measure the environmental conditions and the condition of metal tubing or formations surrounding the downhole tool through the sensors 9.

The tool may further comprise an apparatus such as an expandable connector 4 for creating an electrical connection between the downhole tool and the metal tubing 2, and at least one conductive element such as a conductive element or cathode 1. FIG. 2 shows several conductive elements 10 and FIG. 3 shows said conductive elements 10 expanded in order to reduce the distance to the metal tubing. The conductive elements 10 may also rotate. Said conductive elements 1 and 10 are used to corrode the metal tubing using an electrolytic process.

Also included in FIG. 1 is component 6, such as a turbine, that drives the circulation of the fluid around the tool to recirculate the electrolyte and aid the transfer of heat from the power unit 7 and the conductive elements 1 and 10, into the electrolyte. The component 6, such as a turbine, is for instance placed above and below the power supply 7. Component 37 in FIG. 1 is an instrument operable to measure the diameter of the metal tubing 2 and component 38 is an apparatus that centralizes the downhole tool below conductive element 1 and 10, both of which are optional.

The spacers 3 are made of non-conductive material and are used to separate the conductive elements 1,10 from the metal tubing 2 in order to avoid a short. Said spacers are shaped to reduce the contact area with the metal tubing 2, which in turn helps to minimize the current density over the surface of the conductive elements.

Further details of the invention and its components shall now be explained.

Clamping elements: The tool will generally comprise at least one mechanical, hydraulic, or electro-mechanic clamping element 5 that can anchor and centralize the downhole tool to and within the metal tubing. Said clamping elements can be placed above or below the conductive elements (or both). If placed below the conductive element, the clamping elements may only be operable to centralize the downhole tool and not clamp to the metal tubing 2. The clamping elements can be fitted with a release mechanism that will retract the connectors in the event of a tool failure. The downhole tool will typically include at least two clamping elements 5. One of these clamping elements may also act as a Connector to metal tubing.

Connector to metal tubing: The tool also contains at least one mechanical, hydraulic, or electro-mechanical coupling element 4 that electrically connects the downhole tool to the metal tubing. Said connector can be placed above or below the conductive elements, but will generally be fitted above the conductive elements. The coupling elements 4 to metal tubing 2 can be fitted with a release mechanism that will retract the connectors should the tool fail. Said connector to metal tubing can also anchor and centralize the downhole tool to the metal tubing 2, as seen in FIGS. 2 and 3, but it can be dedicated for the electrical connection only, as seen in FIG. 1. One or more of the clamping elements 5 described above may therefore also act as coupling elements 4 to provide an electrical connection between the metal tubing and the tool.

Power unit: The power unit 7 is generally located inside a protective enclosure 17 and comprises, among other components, one or more power converter modules 11 that convert the electrical power provided from the power source into the required high electrical current.

The downhole tool receives electrical power from the power source located at the surface through a wire or cable 8 or from a downhole hydro-electrical power supply or from a downhole battery. The electrical power can be provided to the downhole tool as high current/low voltage DC power, more preferably as high voltage/low current AC power and still more preferably as high voltage/low current DC power.

When providing a high current/low voltage DC power from the surface directly to the conductive elements 1,10, said electrical currents can be preferable between 0 and 15,000 Amps, more preferable between 0 and 6,000 Amps and still more preferable between 0 and 3,000 Amps. This method to provide the electrical current may be used at depths between 0 and 3000 meters, more preferably between 0 and 1000 meters and still more preferably between 0 and 300 meters. When this method to transfer current to the conductive elements 1,10 is used (i.e. when power is delivered directly to the conductive elements from the surface without conversion), a downhole power unit 7 may not be necessary as the electrical current will be directly provided to the conductive element 1,10 and other downhole tool components. However, a downhole power unit 7 may still be used to source electrical power to other components within the downhole tool.

The provision of electrical power in the form of high voltage/low current AC power will not be further described as it is very similar to the more preferable high DC voltage/low current transfer and conversion method which will be described below. The main differences will be providing the electrical power in the form of an AC voltage and current instead of DC voltage and a current. An AC/DC power converter will therefore need to be used instead of a DC/DC power converter in order to convert the AC power into an output current for input to the conductive elements. Said output electrical current is preferably DC or pulsating current (combination of AC and DC) and can contain high levels of electrical noise. AC current can be supplied rather than DC or pulsating current, but this will reduce the efficiency of the corrosion process. DC current is the most preferable.

The power provided from a downhole battery inside the enclosure 17 may be high voltage/low current DC power. The battery or batteries may be used to power downhole tool components and/or the conductive elements 1,10. This method is preferred when using the downhole tool to open short sections of metal tubing at all operating depths. For longer sections of tubing, however, an alternative power source may be required. The tool may be operable with power sources of both types in order to be able to switch easily between the two.

It is more preferable to provide high voltage/low current DC power from the surface to the downhole tool. Generally, a DC voltage between 400 and 3,000 Volts, more preferably between 600 and 1,500 Volts and still more preferably between 700 and 1000 Volts is provided. The currents provided may result in available power ranging between 0 to 150 KVA, more preferably between 0 to 20 KVA and still more preferably between 0 to 15 KVA. This method for providing the electrical power from the surface (for example through a wireline) is preferable for all operating depths.

The downhole power unit 7 is operable to convert the high voltage/low current electrical power provided from the surface into a low voltage/high current electrical power for provision to the conductive elements 1,10 in order to corrode the section of metal tubing 2. The current provided by the power unit 7 into the conductive elements 1,10, can range between 0 to 15,000 Amps, more preferably between 0 and 6,000 Amps and still more preferably between 0 and 3,000 Amps. Said output currents are preferably DC or pulsating currents and can contain high levels of electrical noise. The voltages of the power unit 7 may be between 0 and 100 Volts, more preferably between 0 and 20 Volts and still more preferably between 0 and 10 Volts. These parameter ranges allow the speed of corrosion to be maximized, whilst remaining below the required power usage for the tool.

Figure 25:
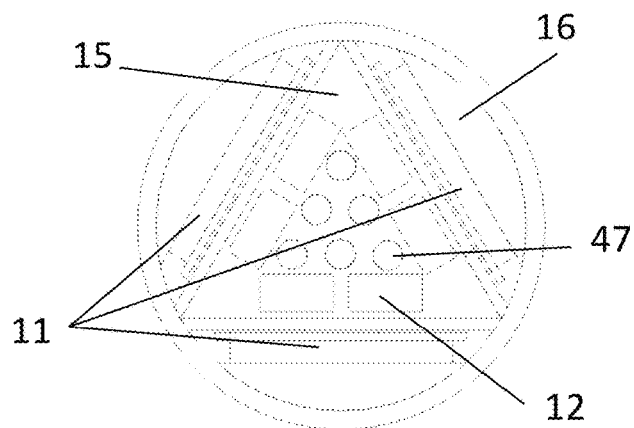
FIGS. 25 to 29 show the different power unit configurations to connect the power modules, including optional pass-through holes for providing flow inside the power unit, communicating or actuating components below the power unit.
Figure 28:
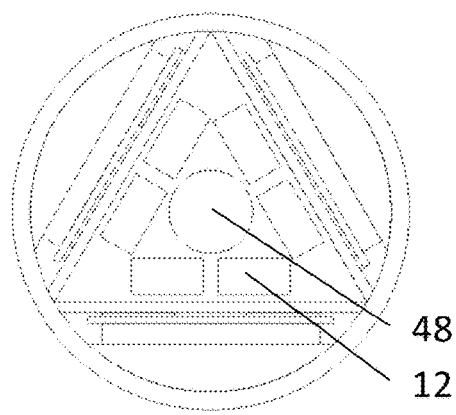
Figure 26:
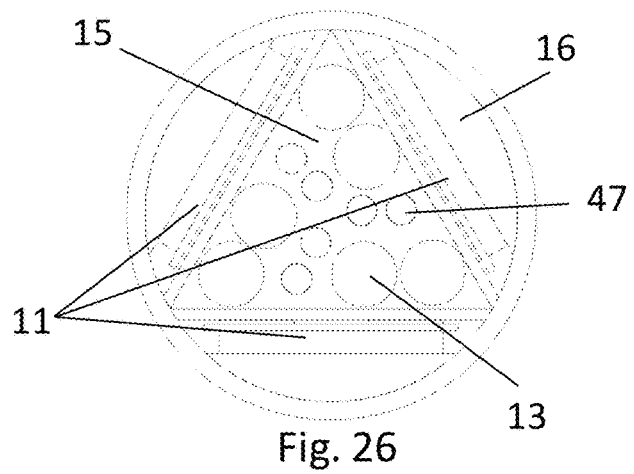
Figure 29:
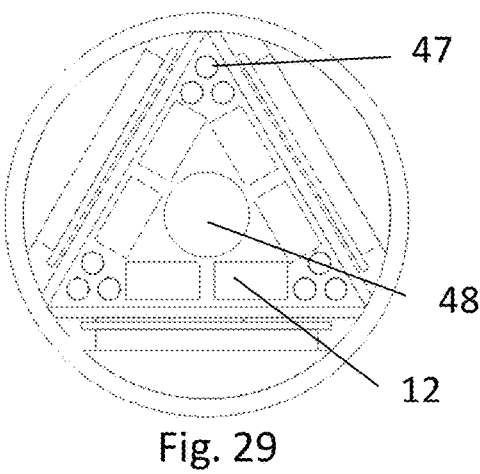
Figure 27:
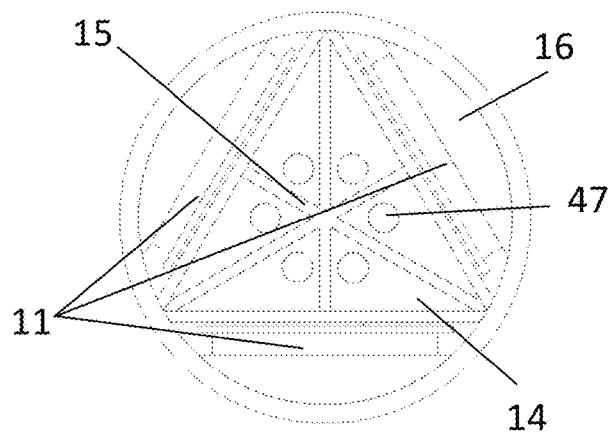

Rather than providing one module for conversion, the power unit 7 can be built with one or several internal DC/DC (or AC/DC) modules 11 that, combined, provide the required current levels. This reduces manufacturing costs and complexity for the unit. Examples of possible embodiments of the power unit are shown in FIGS. 4 to 8. FIG. 4 shows a power unit 7 with six power converter modules 11, while FIG. 5 shows a power unit with nine power converter modules 11. These two configurations are preferable, however any number of power converter modules 11 can be included in the power unit. When several power converter modules 11 are used, the outputs from these power converter modules 11 can be transferred individually to individual conductive elements 10, or a combination of two or more conductive elements, through a highly conductive wire, cable, plate, or bar 12, 13, 14 as shown in FIGS. 6, 7, 8. The internal power converter modules 11 can alternatively all be connected to the same highly conductive elements, which may be cables, plates or bars, which are also connected to the conductive elements 1,10 and the connector to anode 4. In an embodiment, conductive elements are conductive bars having a rectangular cross-sectional shape as seen in FIG. 6. A more preferred cylindrical cross-sectional shape for the elements is shown in FIG. 7 and still more preferable triangular cross-sectional shape is shown in FIG. 8. A mixture of different cross-sectional shapes for the bars can also be used. These conductive bars 12, 13, 14 are assembled together with a structure made of, or containing, electrically insulating material 15 to form the main chassis of the downhole tool. The conductive elements may also contain pass-through holes 47 as in FIG. 27. The pass-through holes 47 can also be positioned in the insulated material 15 as in FIGS. 25 and 26. The pass-through holes are intended to fit isolated electrical cables, hydraulic lines or a combination thereof in order to communicate with or actuate tool components below the power unit 7. The number of pass-through holes may vary depending on the number of components placed below the power unit 7. FIGS. 28 and 29 also show a pass-through hole 48 through which the electrolyte can flow to aid circulation of electrolyte inside the power unit 7. One or more pass-through holes may be provided and will generally extend parallel to the longitudinal axis of the tool housing. The pass-through hole or holes can also potentially provide cooling to the power unit or provide additional cooling to the power unit.

The components of the power converter module 11 that generate heat can be in contact with the enclosure 17 via a highly thermally conductive element 16 in order to dissipate the heat. In embodiments, the heat dissipated may be used to increase the temperature around the conductive elements 1,10 which will increase the conductivity of the brine and therefore the speed of corrosion. FIGS. 4 to 8 show the thermally conductive element 16, which can extend alongside all of the power converter modules 11.

All of the modules are placed inside an enclosure 17, which is capable of withstanding the downhole environment. The DC/DC modules (or AC/DC modules) will also be in contact with said enclosure 17 as a method to transfer heat to the electrolyte, metal tubing 2, and formation. The heat transfer will then both cool the electronic components of the internal modules and increase the temperature of the electrolyte. The temperature increase will further increase the conductivity of the electrolyte.

The power unit 7 and all of its modules 11 have a galvanic isolation between the input and the output. Among other benefits, this isolation will avoid the acceleration of corrosion of the wireline cable connecting the tool to the surface. This unit will also be able to handle a short circuit caused by connecting the conductive element 1,10 to the metal tubing 2.

The power unit 7 may also provide power to the other components of the downhole tool.

Electrolyte circulation module: the circulation component 6, is used to aid the circulation of electrolyte between the conductive elements 1, 10 and the metal tubing 2 as well as the enclosure 17. It can be stand alone or be part of the expandable conductive elements 10. In the case that component 6 is stand alone, it can be placed above or below the enclosure 17 as well as above or below the conductive elements 1,10. It can provide flow rates which are preferably between 0 and 100 liters per minute, more preferably between 0 and 20 liters per minute or even more preferably between 0 and 10 liters per minute. If the function of driving the circulation of the fluid is also performed by using the expandable conductive elements 10, said expandable conductive elements 10 or portions of the tool or the entire tool will be able to rotate either continuously or in an oscillating manner. The circulation of fluid will then be helped by the movement of the non-conductive elements 3. The non-conductive elements 3 can also be made of abrasive material and be used as abrasive or milling elements, said abrasive elements having optimal shape to drive the circulation of fluid. Said elements may also work as spacers between the conductive elements and the metal tubing.

Figure 9:
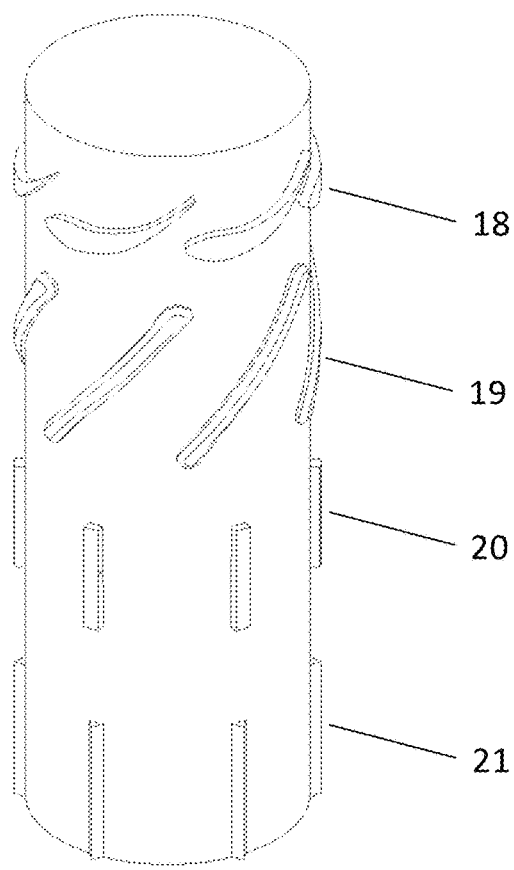
FIG. 9 shows examples of spacers with different shapes.
Figure 18:
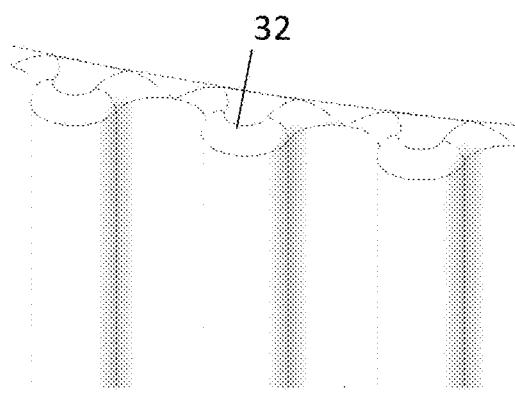
Figure 19:
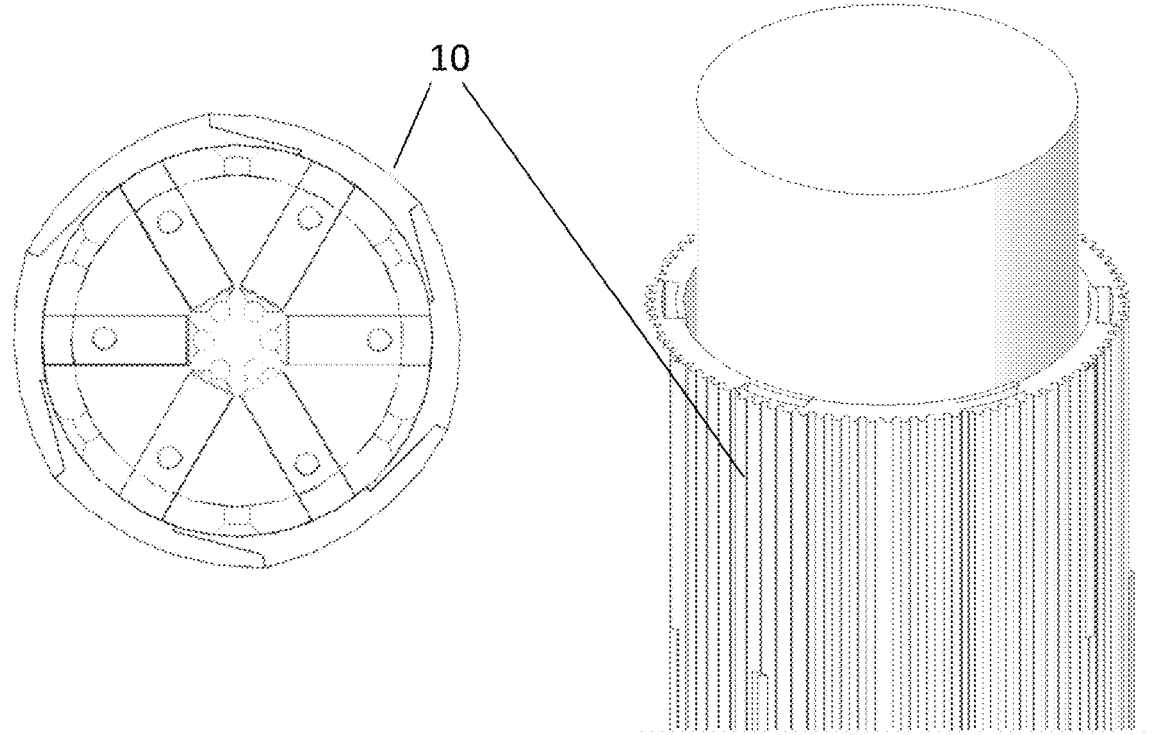
FIG. 19 to 22 show alternative solutions to reduce the gap when extending the conductive elements.

Spacers: the purpose of the spacers 3 is to maintain a physical separation between the conductive elements 1,10 and the metal tubing 2 so a short circuit is avoided. The non-conductive spacers 3 can provide a gap of between 0.05 to 20 mm, more preferably between 0.05 and 10 mm or even more preferably between 0.5 and 2 mm. Said non-conductive elements will be shaped to reduce the area in contact with the metal tubing. FIG. 9 shows several possible shapes for the spacers 18, 19, 20, and 21. Different shapes and positions for the spacers can be advantageous in different applications. For example, the shape shown in FIG. 18 can be used when the rotating conductive elements are used in order to help to circulate the electrolyte. FIG. 19 shows a spacer placed at an angle, which enhances the escape of hydrogen between the conductive elements and the metal tubing when the electrolytic process is perform in deviated wells. The shape of the spacers in FIG. 21 has a minimal contact area with the conductive element compared to those shown in FIG. 20, and is thus generally preferable. A combination of differently shaped spacers may be used, but it is preferable for spacers all to be of the same shape and size. Where a number of conductive elements are used, each may include at least one spacer. The size of the spacers should be kept to a minimum whilst still providing the function of preventing a short between a conductive element and the metal tubing or casing.

Electrically conductive elements or cathodes 1,10: The function of the conductive elements or cathodes 1 and 10 is to corrode the metal tubing 2 in the wellbore using an electrolytic process. The downhole tool can contain one or more shaped conductive elements 1 and 10. The conductive elements are positioned in the center of the well (around or along the longitudinal axis of the wellbore and typically also around and equidistant to the longitudinal axis of the tool itself), and can be formed from many conductive materials such as, but not limited to, steel, stainless steel, aluminum, copper, titanium, graphite, nickel or other alloy. The conductive element or elements may be provided with a coating that reduces the overpotential between the conductive elements and the electrolyte.

The conductive element or elements can also have different shapes that will result in, among other things, a controlled speed of corrosion at different positions of the metal tubing and a reduction in power consumption during the electrolytic process, as described in more detail below.

One of the reasons for controlling the speed of corrosion at different positions of the metal tubing 2 is to corrode the metal tubing 2 that is located at a downhole end of the tool (which will typically also be at the opposite side of the tool from the electrical connector 4) faster that the metal tubing 2 closer to the connector 4. This ensures that the metal tubing 2 surrounding the conductive element(s) or cathode is, at all times during the corrosion process, electrically connected to the connector 4. Failing to control the speed of corrosion along the metal tubing 2 may mean that sections of the tubing which are not yet corroded become isolated due to sections closer to the connector being corroded first. These sections of the tubing will then lose electrical connection to the connector to anode 4, which will mean that they will not be fully corroded.

Figure 10:
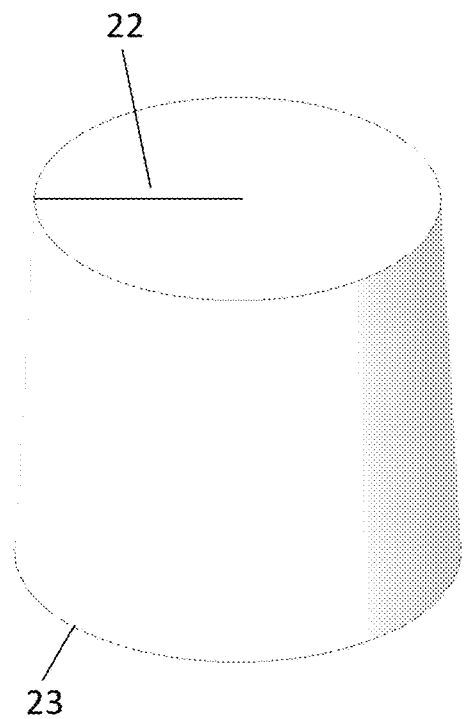

The preferred methods to control the speed of corrosion are:

Use of a frustoconical conductive element: using a conductive element 1 with a frustoconical shape as shown in FIG. 10, results in a larger volume for electrolyte being present between the smaller diameter part of the cone and the metal tubing (which is closer to the connector 4 and is at the top of the tool) than the bigger diameter part of the cone and the metal tubing (which is farther from the connector 4 and closer to the bottom 23 of the tool). This diverts more electrical current to the bottom portion than the top portion of metal tubing 2, so the bottom portion of the metal tubing 2 corrodes faster than the top portion.

The preferred truncated conical (or frustoconical) shape has a radius 22 at the top that is between 1 to 50 mm smaller than the radius at the bottom. The difference between the radii at the top and bottom is more preferably between 1 and 10 mm and still more preferably between 2 and 5 mm. The frustoconical shape may have a smooth surface as shown in FIG. 10, or may be formed of a series of cylinders of gradually increasing diameter.

Figure 11:
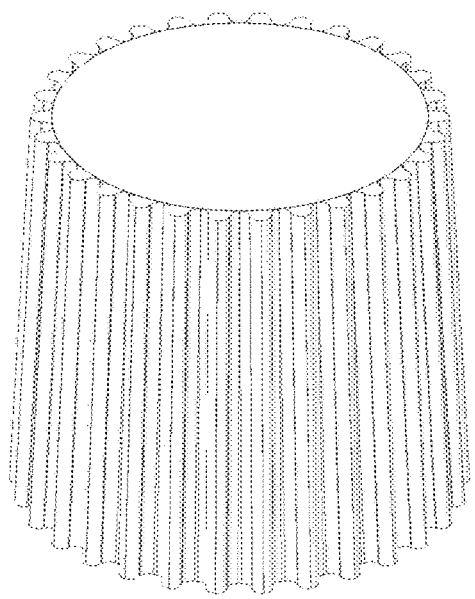

Additional surface features may be provided on top of the shaped conductive element. FIG. 11 shows a conical conductive element shaped with additional surface grooves.

The conical shape method can also be applied when several conductive elements 10 are used. These elements will sit together to form a modular element having a substantially frustoconical shape, the diameter of which may be adjustable using extendable rails as described above. Means may be provided to close any gaps between the conductive elements where a larger diameter modular element is required, as described in more detail below.

Controlled expandable rails: when using several conductive elements 10, these may be attached to expandable rails that will allow for adjusting the distance from the outer surface of each conductive element to the metal tubing 2. The expandable rails may also allow for an adjustment of the angle or shape of the elements. The expansion could be controlled in order to be able to adjust the separation of the bottom portion of the conductive elements 10 to be closer to the metal tubing 2 than the top portion (to configure the modular element as a truncated cone, for example).

Surface shape: changing the surface shape of the conductive elements 1,10 as shown in FIGS. 11 to 15 will result in changes in the current density on the outer surface of the conductive elements. The surface can therefore be shaped to adjust the current density at the top and bottom of the conductive element 1, 10 to control the speed of corrosion along the length of the conductive elements.

FIG. 11 shows a preferred sinusoidal surface pattern along the length of the conductive element 1,10. Grooves (which may be longitudinal, radial, or helical) increase the surface area of the conductive element, which in turn reduces the current density across its surface and minimizes power usage. Grooves with a smooth cross-sectional profile, such as a sinusoidal profile, avoid sharp edges which may result in areas of high current density.

Figure 12:
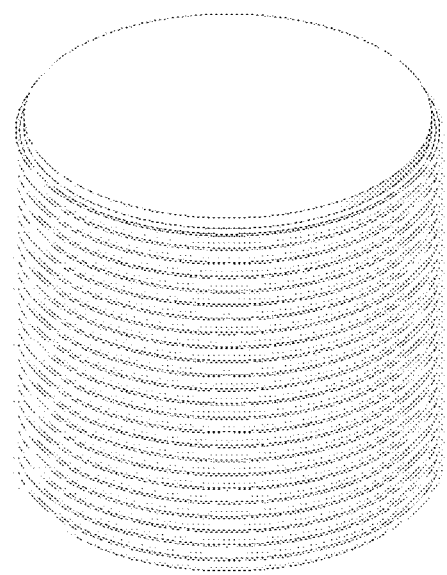

In the example shown in FIG. 11 the modular element or single element forms a tapered or conical form. FIG. 12 shows the preferred sinusoidal surface pattern placed across a conductive element 1,10 having a cylindrical form. FIGS. 13 and 14 shows the preferred sinusoidal surface pattern forming a helical ridge or thread at the surface of the conductive element 1,10 (which may be of any shape, such as frustoconical as for the other examples given above). Where a helical groove is present, the distance between the threads at the top of the conductive element 1,10 can be different from those at the bottom, as shown in FIG. 13.

The elements shown in FIGS. 10 to 14 can all be frustoconical (tapered) or can have a cylindrical shape.

FIG. 15 shows a preferred sinusoidal surface shape for grooves in the surface of the conductive element 1,10. An alternative method to control the speed of corrosion uses different measurements 24 to 28 at the top compared to the bottom to differentiate the average amount of electrolyte and surface area between the conductive elements 1,10 and the metal tubing 2.

The shape and materials of the conductive element 1,10 can also influence the consumption of electrical power. During the electrolysis, hydrogen bubbles are formed at the surface of the conductive element 1,10 decreasing the effective surface area of the conductive element 1,10 itself. The bubbles temporally isolate areas of the conductive element 1,10 from the electrolyte, increasing the overall resistance and therefore increasing the voltage drop and power consumption.

This effect can also be represented as a function of the current density: i=I/A Where: i=Current Density, I=Current, A=Area.

When the effective surface area of the conductive element 1,10 is decreased, the current density at the conductive element 1,10 increases. Higher current densities will result in higher power dissipation in the form of heat.

A method for reducing this effect is to increase the surface area of the conductive element or elements 1,10 by machining grooves in its surface as exemplified in FIGS. 10 to 15. A larger surface area of conductive element 1,10 compensates for the area lost by the formation of bubbles. A higher density of grooves or indents may be provided in regions of the element expected to be particularly susceptible to the effect of hydrogen bubbles being formed.

FIG. 15 shows one of the preferred surface patterns wherein a number of longitudinal semi-circular grooves alternating with semi-circular ridges are formed on the surface of the conductive element 1,10. The distance 24 between ridges can be between 1 mm and 20 mm, more preferably between 2 and 10 mm and still more preferably between 2 and 5 mm. Distance 26, which represents a vertical (radially extending) portion of the curve between each groove and peak can be between 0 mm and 20 mm, more preferably between 0 and 15 mm and still more preferably between 0 mm to 5 mm. Radii 27 and 28 of the semi-circular grooves and peaks can be equal to or different from each other, and may in some examples be between 1 mm and 2 mm although the radius may be outside this range. Distances 24, 25, 26, 27 and 28 can also be different at the top of the conductive element 1,10 compared to the bottom.

Figure 16:
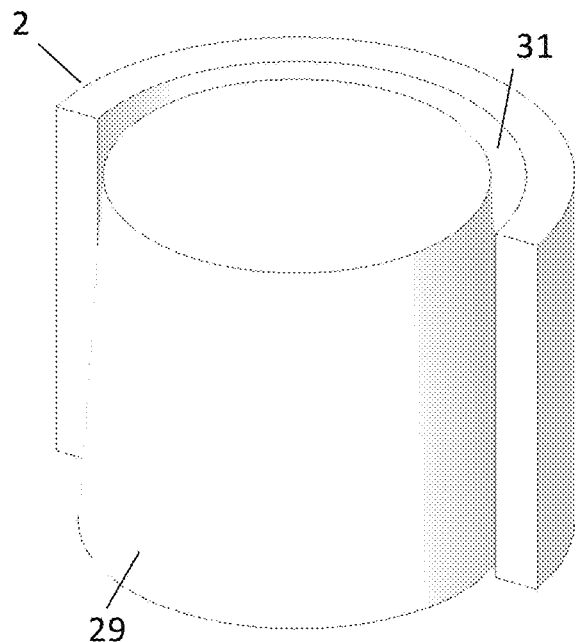
Figure 17:
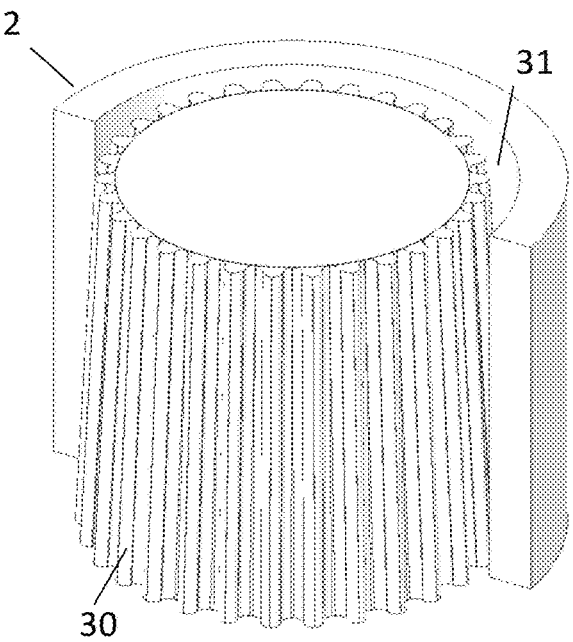

Including patterns on the surface of the conductive elements 1,10, results in a surface area of the conductive element 1,10 that is larger than the internal surface area of the surrounding metal tubing 2. FIG. 16 shows as an example of a 100 mm long conical cathode without groves and with a surface area 29 of 32K mm$^2$ surrounded by a 100 mm long metal tubing 2 with an internal surface 31 area of 36K mm$^2$. The surface area 29 of the conical cathode being 0.9 times the size of the internal surface area 31 of the metal tubing 2. FIG. 17, in contrast, shows a 100 mm long conical cathode with sinusoidal surface groves and with a surface area 30 of 46K mm$^2$ surrounded by a 100 mm long metal tubing 2 with an internal surface area 31 of 36K mm$^2$. The surface area 30 of the conical cathode being 1.28 times the size of the internal surface area 31 of the metal tubing 2.

The surface area of the conductive element 1,10 is preferred to be between 0.7 and 4 times the size of the internal surface area 31 of the surrounding metal tubing 2, more preferably between 1 and 2 times and still more preferably between 1.1 and 1.8 times.

To avoid sharp edges and their associated high current density, the conductive elements 1,10 can also have curved bottom and/or top edges. An example showing curved edges 32 for a cathode with sinusoidal surface grooves is shown in FIG. 18.

The length of the conductive element 1,10 is preferred to be between 1 cm and 10 meters, more preferably between 1 and 5 meters and still more preferably between 1 and 2 meters.

Other methods to reduce the power consumption are:
Increase conductivity of the electrolyte: by increasing the concentration of ions in solution, the conductivity will increase and the power consumption will decrease. A preferred method to increase the conductivity is to increase the salt content of the brine in the well. The preferred concentration of salt present in the electrolyte is between 2 to 30 wt %. Said salts contained in the electrolyte can include NaCl, $CaCL_2$, and KCl. An appropriate electrolyte could be, as an example, sea water with added NaCl.

Increase the temperature of the electrolyte: higher temperatures increase the mobility of ions, thus increasing the conductivity. The higher the temperature of the electrolyte the lower the resistivity and the lower the power consumption. The preferred temperature of the electrolyte is between 70 and 120 degrees Celsius. The preferred method for maintaining the electrolyte at the desired temperature is to transfer heat from the power unit 7 that may be present in the enclosure 17 to the electrolyte by using a temperature conductive element 14 coupled the Power Modules 11 to the enclosure 17. The electrolyte can be cooled if necessary by re-circulating the fluid around the tool using the component 6 (or be rediverting heat from the power unit away from the electrolyte for a time). The temperature of the electrolyte can be monitored continuously or intermittently, and the heating and cooling mechanisms used to correct for any drop or increase in temperature.

Controlled downhole tool position: Using methods (such as a frustoconical conductive element) to corrode the metal tubing 2 adjacent the bottom 23 of the conductive element faster than the metal tubing adjacent the top 22 of the element will result in the metal tubing to be fully corroded at the bottom first. The portion of the conductive element 1,10 where the metal tubing 2 has been fully corroded will then not be surrounded by any metal tubing 2 or, if there is a second metal tube of larger diameter surrounding the internal tubing, this will be farther away from said section of conductive element 1,10. Both situations will result in an increase of the power consumption. Moving the downhole tool above the recently fully corroded metal tubing 2 will keep the conductive element 1,10 fully surrounded by metal tubing 2 and therefore maintain an efficient use of the electrical power.

Cathode Material: The Activation Overpotential is the activation energy necessary to transfer an electron from an electrode to an electrolyte. Higher overpotential will result in a higher power consumption. Choosing the right material for the conductive elements 1,10 can therefore help to reduce the power consumption. The preferred materials to build the conductive elements can be steel, stainless steel, aluminum, copper, titanium, graphite, nickel or other alloy or coating that reduces this overpotential between the conductive elements and the electrolyte.

Figure 20:
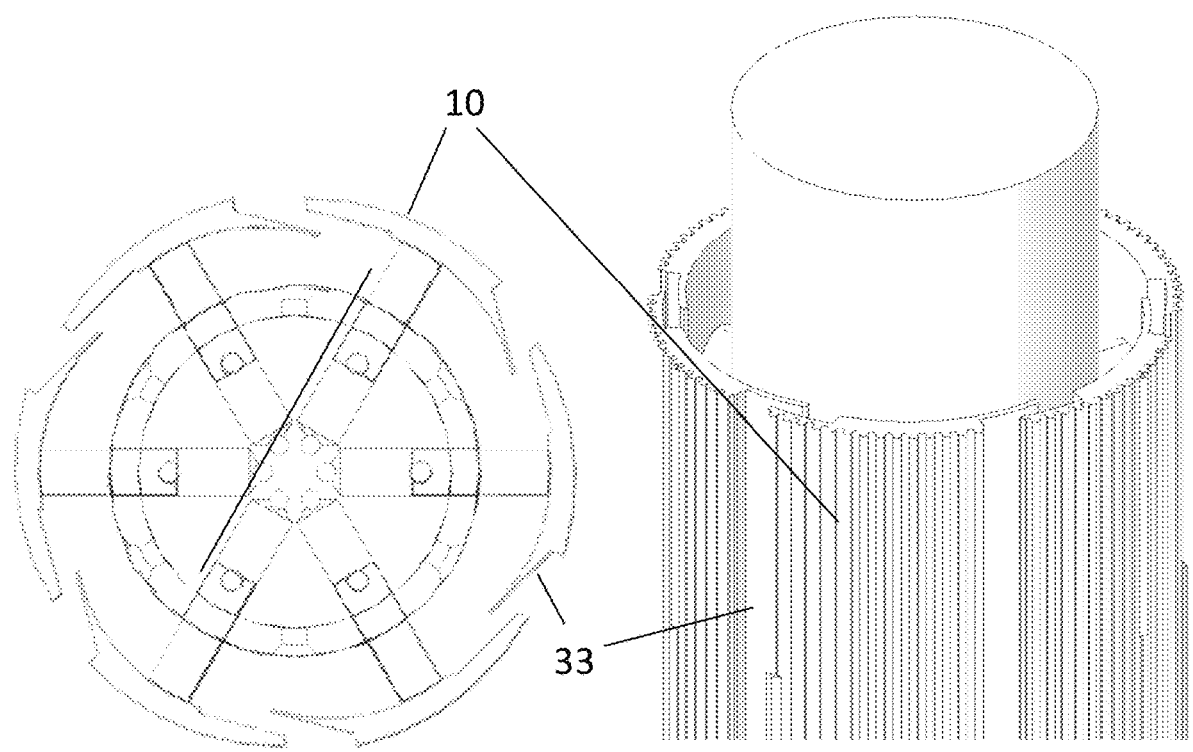
Figure 21:
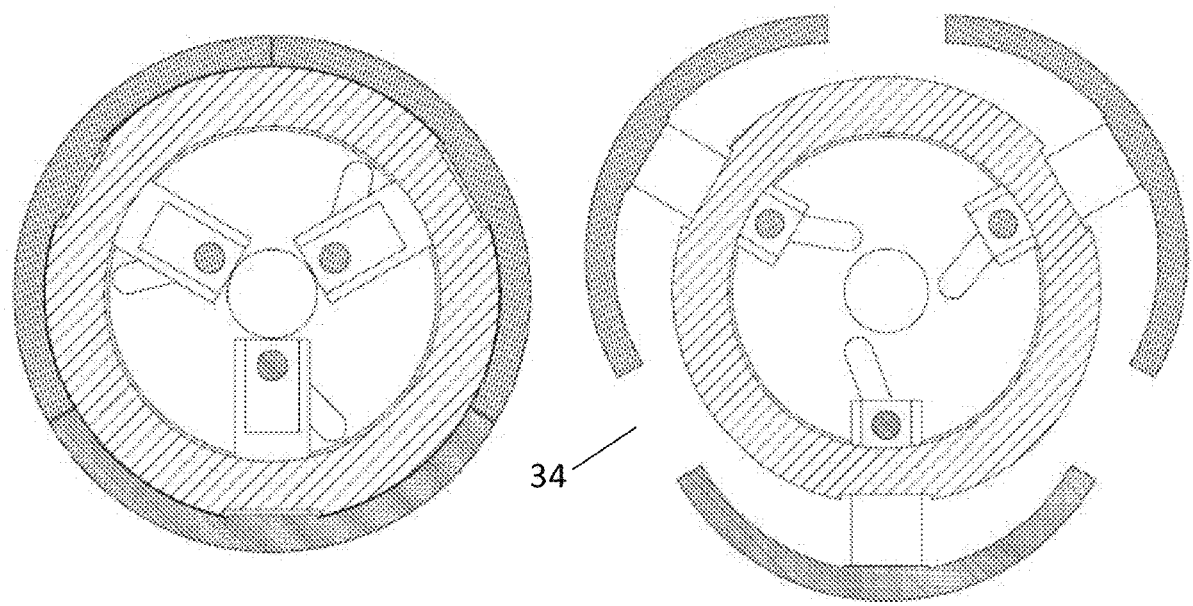

Reduce the distance between the conductive element 1,10 and the metal tubing 2: even though the electrolyte surrounding the conductive elements 1,10 is conductive, it still offers some electrical resistance that causes power dissipation in the form of heat. Due to the internal diameter constrains present in a well, the electrolyte present between the conductive elements 1, 10 and the metal tubing 2 can substantially increase the power dissipation. The preferred method to decrease the distance between the conductive elements 10 and the metal tubing 2 is to use a mechanical, hydraulic or electromechanical actuators to move the conductive elements 10 from the center of the downhole tool towards the metal tubing 2. FIGS. 2 and 19 show examples of several conductive elements 10 in a closed position, while FIGS. 3 and FIG. 20 show the same or similar conductive elements 10 extended in order to reduce the distance to the metal tubing.

A consequence of being able to move the conductive elements 10 from a closed position to an extended position is that, when extended, there will be areas of metal tubing 2 that will not be covered by the conductive elements 10. These gaps 34 in coverage can be seen in FIG. 21 and will cause the metal tubing 2 to be corroded unevenly.

To minimize this coverage gap and its effects, the following methods may be used:

Overlapping cathode plates: the conductive elements 10 are designed to overlap with each other. A possible method for providing overlapping conductive elements is shown in FIGS. 19 and 20 where the conductive elements 10 each contain an extension 33 protruding from one edge which makes the conductive elements 10 overlap each other and reduces the gap 34. The protruding portion sits underneath (or above) an adjacent element when the diameter of the compound element is reduced. The extension 33 can be made of a flexible conductive material and may also include surface shapes such as surface grooves for increasing the surface area of the extension.

Figure 22:
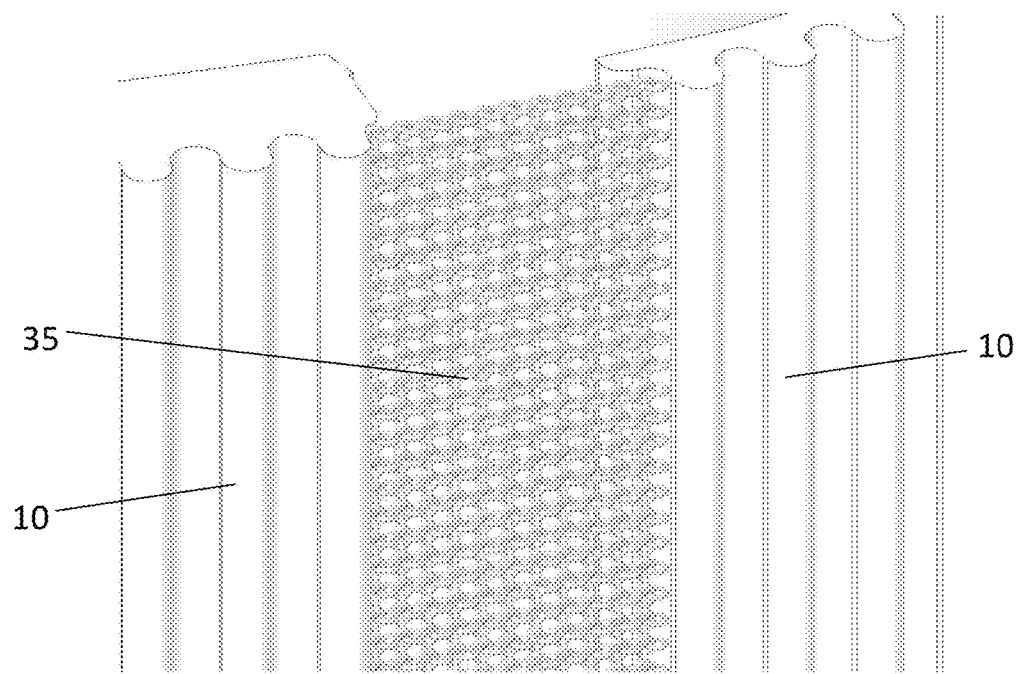

Conductive net: a conductive and flexible net 35 connects the different conductive elements 10. An example of said net is shown in FIG. 22 where the net is made of small conductive rings interlocking with each other. The net can be made of interlocking components with more complex shapes with the purpose of increasing the surface area of the net. The net can be made of any of the preferred conductive materials and preferably will be of the same material as the conductive elements 10.

Rotating conductive elements: the conductive elements 10, may be configured to rotate so that the gap is not constantly located adjacent one area of the metal tube. This will therefore average the position of the gap on the tubing, resulting in an even corrosion of the metal tubing 2. The rotation can be either continuous or oscillating. The conductive elements 10 can rotate independently or together with entire tool, the power unit, or some of its modules. The rotation can occur only while the electrical power is applied to the conductive elements 10 or also when there is no electrical power applied. In the latter case, the current may be applied intermittently to provide the momentum for rotation of the conductive elements by a certain amount each time the current is applied and the elements may continue to rotate even when the current is not being applied.

There are many other possible reasons for the metal tubing 2 corroding unevenly. One reason is that the metal tubing may have an oval shape instead of circular due to manufacturing quality or deformation over time. Other reasons might involve the effects of the non-conductive hydrogen bubbles. Said bubbles displace the conductive electrolyte, reducing the available electrical path between the conductive elements 10 and the metal tubing 2, increasing the overall resistance. In wells with inclination, the hydrogen bubbles produced during the electrolytic process will tend to float and accumulate in the upper side of the metal tubing 2. Differences in concentration of hydrogen bubbles around the metal tubing 2 will result in different resistivities in the electrolyte around said metal tubing 2 and therefore more corrosion occurs in the side of the metal tubing 2 exposed to the less resistive electrolyte. In non-vertical wells, the lower side of the metal tubing 2 could corrode faster than the upper side.

Methods to minimize uneven corrosion of the metal tubing 2 include:

Independently movable conductive elements: each of the expandable rails of the conductive elements 10 (or other means for adjusting the position of the elements) can be adjusted independently of each other which can allow for adjusting the distance to the metal tubing 2 to compensate for uneven corrosion due to deformities of the metal tubing 2, or the effects of the accumulation of nonconductive by-products in wells with high inclination. To aid in this process, the current outputs of each power module 11 connected independently to each conductive element 10, are measured. Said measurements are then used to indicate the optimal separation for each conductive element 10. The adjustment may be carried out automatically in response to measurements of the current indicating uneven erosion, or manual adjustments may be made from a user interface module at the surface.

Centralizing elements: for longer conductive elements 1,10, sagging may occur towards the bottom end, especially in non-vertical wells. This deformation of the conductive element 1,10 will result in a faster corrosion at the lower side of the metal tubing 2. To minimize this effect, a centralizing element 37 may be placed below the conductive element 1,10.

Said centralizing element may contain non-conductive expandable arms 38 with components 39 which aid the positioning of the downhole tool at the desired depths. The centralizing element will reduce the drag by reducing the contact area while the downhole tool is changing position within the well.

Monitoring the progress of the corrosion of the metal tubing provides the information required to efficiently position the downhole tool in the optimal place and to finish the corrosion process accurately in order to minimize any damage to larger diameter metal tubing surrounding the target metal tubing 2. There are several methods available to monitor the corrosion process:

Electrical measurements: the corrosion of the metal tubing 2 will cause the distance between the conductive element 1 and the metal tubing 2 to increase. larger distances will cause the voltage to increase. Additionally, where sections of the metal tubing are fully corroded, the conductive element 1 will not have any surrounding metal tubing, also increasing the voltage drop. Monitoring the voltage will give an indication of the progress of the corrosion process.

Expandable conductive elements: when using expandable conductive elements 10, the conductive elements 10 will expand further as the wall thickness of the metal tubing 2 decreases. Measuring the position of the expandable conductive elements will provide information about the progress of the corrosion.

Measurement of distance to metal tubing: a measuring device can also be used to measure the thickness of or the distance to the metal tubing 2.

Said device can preferably use ultrasonic measurement means to measure the distance to the metal tubing 2 or its thickness. The time taken for reflected signal to return will provide information about the distance of the metal tubing, because an increase in the distance will directly relate to the amount of material corroded and thus the thickness. No reflected signal or a delayed reflected signal from additional structure in the well will indicated that the metal tubing is completely corroded at the measurement depth. It is still more preferable to use an apparatus with expandable, non-conductive strips 37 for the measurement. Extendible elements 40 can be located around the circumference of the tool at the lower end of the conductive elements. These may include a spring to bias them in the extended position. A sensor is associated with each element and can determine either whether the element is pushed in by the metal tubing or are fully extended, or may be operable to determine how far the elements are extended, and thus the current width of the metal tube at the depth of the elements. When the region of the metal tube adjacent the elements 40 has been corroded away completely, elements 40 will be fully extended and their extension is detected by the sensor. In response, the tool can be raised up the well until the elements 40 are pushed in again by the metal tube, at which point the conductive elements are completely surrounded by metal tube again and efficient corrosion can recommence.

Figure 23:
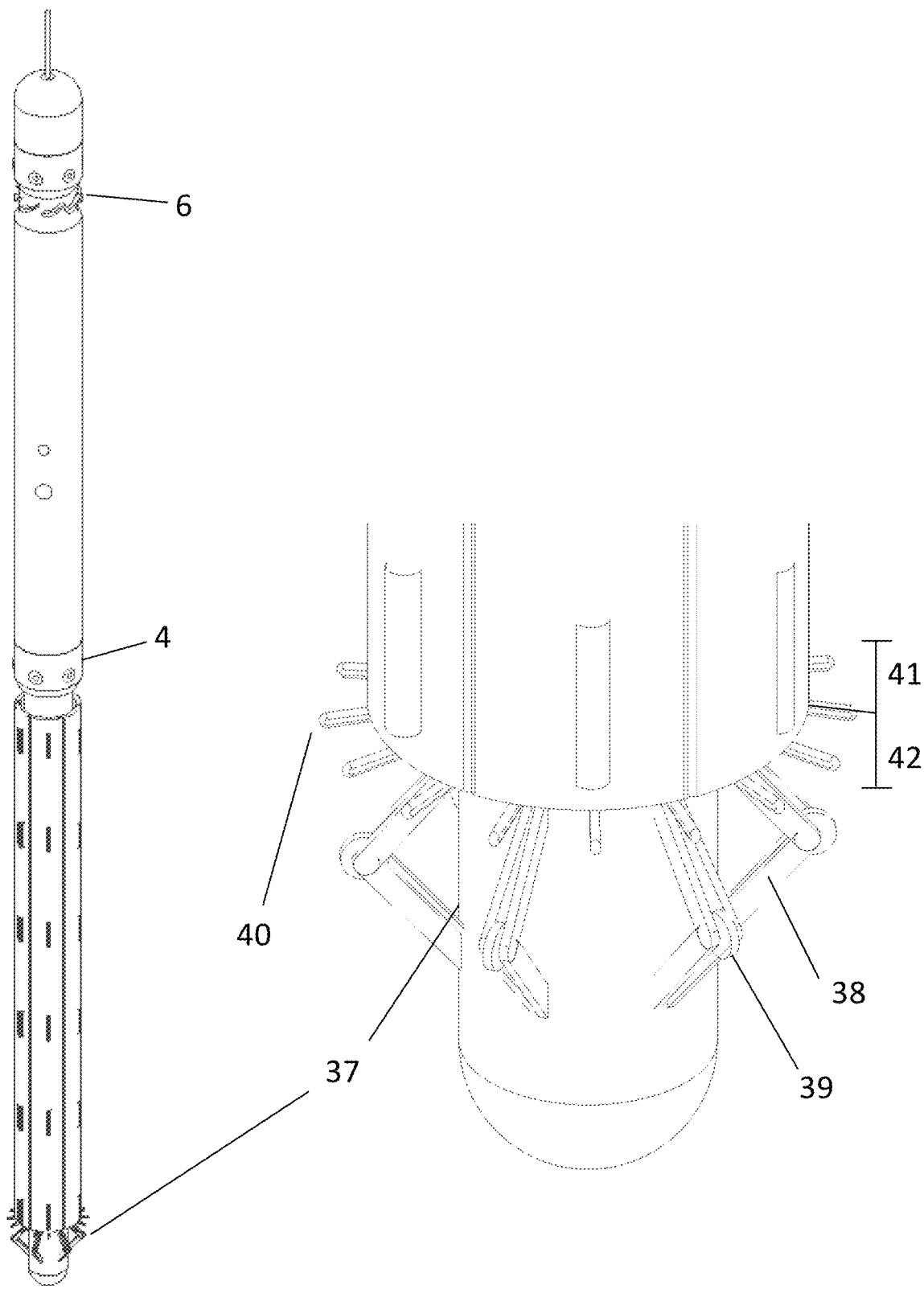
FIG. 23 shows an example of calliper measurement.

A preferred position for the device is at or near to the bottom of the conductive element 1,10 as seen in FIG. 23. Said device will preferably provide measurements of the width or absence of the metal tubing 2 located between 100 mm above the bottom end 41 of the conductive element 1 to 10 to 100 mm below the bottom end 42 of the conductive element 1,10. More preferably the instrument will provide measurements of the width or absence of the metal tubing 2 located between 50 mm above the bottom end 41 of conductive element 1 and 10 to 50 mm below the bottom end 42 of the conductive element 1,10. Still more preferably the instrument will provide measurements of the width or absence of the metal tubing 2 located between 20 mm above the bottom end 41 of the conductive element 1,10 and 20 mm below the bottom end 42 of the conductive element 1,10. The location of the measurement will result in an operational advantage by providing immediate information about the corrosion progress and where the metal tubing is being be corroded first. This information can be used to adjust the position of the tool within the well (i.e. by moving it up the well such that the conductive elements are completely surrounded by non-corroded metal tubing) or to adjust the position of the conductive elements to compensate for uneven corrosion if desired.

Generally, measurement means are configured to provide an indication as to whether the part of the metal tube adjacent the bottom end of the conductive elements has completely corroded away. If it has, then the tool can be moved up the wellbore in response. If measurement means are not present or not available for use, the tool can be moved up the wellbore based instead on an estimated time to completely corrode an area of the metal tube adjacent the bottom of the conductive element. The tool can also be raised continuously or periodically according to preset timings.

The corrosion process is therefore carried out in stages, the tool being raised in the well ahead of each stage in order to provide bottom to top corrosion of the section of pipe. This ensures that a proper connection is maintained to regions of the pipe located higher up the well at all times, and that the pipe is evenly corroded.

Figure 24:
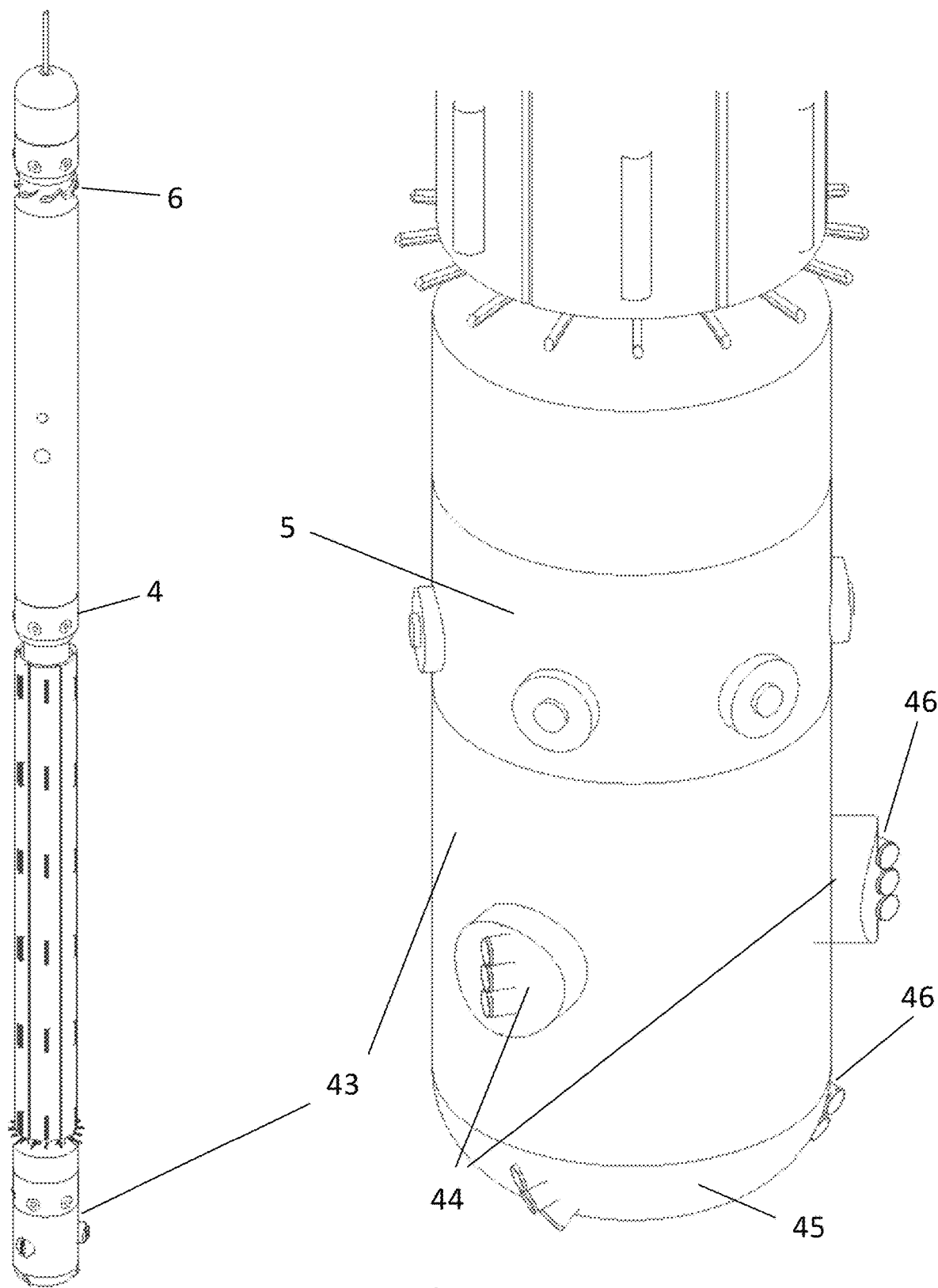
FIG. 24 shows an example of the optional milling apparatus to remove cement after the casing has been dissolved.

Milling Module: the downhole tool may further contain an apparatus to clean the scale or other materials deposited on the surface of the casing to be dissolved. The milling apparatus could also be used to mill the cement that might be behind the dissolved casing. By including this apparatus in the downhole tool, the casing can be cleaned and said casing and cement can be removed in one run, making the window opening operation more efficient. FIG. 24 shows the rotating milling apparatus 43 at the bottom of the downhole tool. Said apparatus may contain expandable cutter blocks 44. This cutter blocks 44 are fitted with hard milling components 46 such as PDC or tungsten cutters among others which are operable to expand to remove the cement behind the casing. The milling apparatus 43 may also contain hard milling components 46 placed at the bottom 45 of the milling apparatus in order to clean the casing for scale or other material deposited on the surface of the casing. The bottom 45 of the milling apparatus 43 can also be fitted with a conventional drilling bit.

Downhole Tool Operation:

The brine contained in the well is conditioned to be of the preferred conductivity.

The downhole tool is lowered in to the well as a conventional wireline tool. It is positioned at the desired depth and the clamps 5 and the connector to metal casing 4 are activated.

If the downhole tool is fitted with a milling apparatus 43, said apparatus can at this stage be used to clean the casing from scale or other material depositions in its surface.

The conductive elements 1,10 are then provided with the optimal electrical current by a battery coupled to the power unit 7 or directly from the surface through the wire, at which point the accelerated corrosion of the metal tubing 2 starts. The conductive elements 1,10 can also be provided with vibration at an optimal frequency to allow the gas bubbles forming in the conductive element 1,10 to escape more quickly.

If only one conductive element 1 is used, this will be suspended in the center of the metal tubing when at least two clamps 4/5 are activated. Depending on the length of the conductive element 1, the centralizer 37 may also be activated.

If several conductive elements 10 are present, expandable rails or other means can be used to position these, and the conductive elements 10 will be expanded to the desired distance from the metal tubing (although the distance will generally always be limited by the non-conductive spacers 3). Once expanded to the optimal distance the high electrical current will be provided.

The temperature of both the power unit 7 and the electrolyte is monitored and heat from the power unit transferred to the electrolyte to heat it if desired. The direction and flow of the circulation module 6 (if present) may be set to either cool the power unit 7, increase the temperature of the electrolyte surrounding the conductive elements 1,10 or aid in the flow of hydrogen bubbles from the electrolytic process.

If the downhole tool is fitted with rotating conductive elements 10, then the continue or oscillating rotation will begin in order to even out the corrosion in the metal tubing 2, to help to clean the surface of the metal tubing from the corrosion products, or aid the circulation of the electrolyte surrounding the conductive elements 1,10.

When using expandable conductive elements 10, the output of each power module 11 can be monitored. If any of the modules is providing different current than the others, this could be an indication that the conditions around the conductive element 10 connected to said power module 11 are also different. The distance between each of the conductive element 10 and the metal tubing 2 can then be independently changed to modify the speed of corrosion and overcome the consequences of the difference in electrical current.

The geometrical changes in the metal tubing 2, caused by corrosion, will result in changes in the conditions of the electrolytic process, affecting the voltage drop between the conductive elements 1,10, and the metal tubing 2, the electrical current, and power consumption. By monitoring these electrical measurements, the operator or software linked to the tool itself, can decide if the metal tubing has been partially or fully corroded. When using expandable conductive elements 10, measurements of how far the rails have expanded can provide information as to the amount of metal tubing 2 that has been corroded.

If a calliper is used, then this measurement can be taken throughout the corrosion process.

Once the measurements correspond to the desired levels, the clamps 4,5 are released, if containing expandable conductive elements 10, said conductive elements are closed and the tool can be moved to desired position to continue the process.

The downhole tool preferably moves from a deeper position to a shallower position in the well, resulting in a preferable deep to shallow corrosion of metal tubing 2. The downhole tool can be moved in a number of ways. As examples, the tool could be moved by pulling the wireline or coil tubing connected to the downhole tool or by activating the connected downhole tractor or any other apparatus fitted to move the tool or along the wellbore.

Once the desired length of metal tubing 2 has been corroded and the desired window size is open, the tool is pulled to surface.

Depending on the well configuration, there could be cement behind the casing that has been dissolved. If the downhole tool is fitted with a milling apparatus, this can be used to remove said cement.

In some wells, the metal tubing 2 will be surrounded by formation. When corroding sections of metal tubing 2, access to the formation will be gained. Depending on the type of formation and the stability of the wellbore, said formation might trap the exposed conductive elements 1,10. Therefore, the downhole tool can, in some examples, contain a release mechanism that is operable to separate the conductive elements 1,10 from the rest of the downhole tool, so that parts of the tool can be pulled to the surface while the remaining components of the tool can become part of the cross sectional barrier.

The invention claimed is:

1. A downhole tool, for removing sections of metal tubing, said downhole tool comprising:
   one or more conductive elements arranged to corrode a section of metal tubing using an electrolytic process, said one or more conductive elements being formed of electrically conductive material,
   an apparatus to establish a connection between the one or more conductive elements and the metal tubing,
   a power unit configured to provide an electrical current to the one or more conductive elements, and
   one or more non-conductive spacers configured to maintain a physical separation between the conductive elements and the metal tubing, and which are configured to sit against an internal surface of the metal tubing during a corrosion process, and wherein at least a portion of the tool is configured to, at least one of, rotate and oscillate, such that the spacers move against the surface of the tubing.

2. The downhole tool according to claim 1, wherein the size of the surface area of the conductive element is between 0.8 and 4 times the internal surface area of the metal tubing.

3. The downhole tool according to claim 1, wherein the one or more conductive elements comprise the non-conductive spacers.

4. The downhole tool according to claim 1, wherein the non-conductive spacers provide a 0.05 mm to 30 mm gap between the one or more conductive elements and the metal tubing.

5. The downhole tool according to claim 1, wherein the at least a portion of the tool is configured to rotate back and forth in an oscillating motion.

6. The downhole tool according to claim 1, wherein the one or more conductive elements are made of electrically conductive material such as steel, stainless steel, aluminum, copper, titanium, graphite, nickel or other alloy or coating that reduces an overpotential between the conductive elements and an electrolyte.

7. The downhole tool according to claim 1, wherein at least one conductive element is centrally placed in the tool.

8. The downhole tool according to claim 1, wherein several conductive elements are coupled to the power unit and mounted on expandable rails configured to move the conductive elements closer to the metal tubing.

9. The downhole tool according to claim 8, wherein the conductive elements are configured to overlap with each other or contain additional conductive elements that reduce the surface gap caused by the expandable rails moving perpendicularly to the longitudinal axis of the metal tubing.

10. The downhole tool according to claim 8, wherein the conductive elements move closer to the metal tubing, independently from each other.

11. The downhole tool according to claim 8, wherein the conductive elements move closer to the metal tubing to form a frustoconical compound conductive element and a side of said frustoconical compound conductive element with a smaller radius is the closest to the apparatus to establish a connection to the metal tubing.

12. The downhole tool according to claim 1, wherein the surface of the one or more conductive elements is shaped with patterns of, one of, indents or grooves.

13. The downhole tool according to claim 12, wherein the surface of the one or more conductive elements comprises at least one of, longitudinal grooves or helical grooves.

14. The downhole tool according to claim 13, wherein the conductive elements are shaped to avoid sharp edges, and wherein the grooves formed on the surface of the conductive elements have a sinusoidal cross-sectional profile.

15. The downhole tool according to claim 1, wherein the power unit is configured to convert a low current/high voltage input from a power source into a high current/low voltage output for provision to the conductive elements.

16. The downhole tool according to claim 15, wherein said output electrical current is one of, DC or pulsating current and has high levels of electrical noise.

17. The downhole tool according to claim 15, wherein the input to and the output of the power unit are electrically isolated from each other.

18. The downhole tool according to claim 15, wherein the input to the power unit is between 400 and 3,000 volts and the output electrical current from the power unit is between 0 and 15,000 Amps.

19. The downhole tool according to claim 15, wherein the power unit comprises one or more power modules which are connected to the one or more conductive elements through the same common conductors.

20. The downhole tool according to claim 15, wherein the power unit comprises more than one power module and the tool comprises more than one conductive element, and each of the power modules are connected independently to a different one of the conductive elements.

21. The downhole tool according to claim 15, wherein the power unit comprises one or more power modules and wherein conductors connecting the power modules to the conductive elements are placed inside a main chassis of the downhole tool.

22. The downhole tool according to claim 1, wherein the conductive element, or a compound element comprising more than one conductive element, has a smaller diameter at an upper end and a larger diameter at a lower end.

23. The downhole tool according to claim 22, wherein the conductive element, or a compound element comprising more than one conductive element, has a truncated conical shape.

24. The downhole tool according to claim 1, wherein the one or more conductive elements are configured to rotate continuously.

25. The downhole tool according to claim 1, wherein the downhole tool is submerged in an electrolyte having a salt concentration between 2 to 30 wt %.

26. The downhole tool according to claim 1, wherein the tool is configured to be moved during the corrosion process from a deeper position to a shallower position in the well.

27. The downhole tool according to claim 1, comprising components for driving circulation of fluid around the conductive elements and the power unit.

28. The downhole tool according to claim 27, wherein the components are integral with the conductive elements.

29. The downhole tool according to claim 27, wherein the components for driving the circulation of the fluid are made of non-conductive abrasive material and are used as abrasive or milling elements, said elements being shaped to drive the circulation of fluid.

30. The downhole tool according to claim 1, containing at least one clamping module comprising a mechanical, hydraulic, or electromagnetic device to anchor and centralize the downhole tool and conductive elements to the metal tubing.

31. The downhole tool according to claim 1, wherein the tool further comprises a logging sensor to log properties from formation, cement, metal tubing, and environment around the tool.

32. The downhole tool according to claim 1, comprising a mechanism configured to detach the conductive elements from the downhole tool in response to a user input.

33. The downhole tool according to claim 1, comprising an apparatus configured to measure progress of the corrosion process located at or adjacent a bottom edge of the conductive elements, providing measurements of a thickness of the metal tube at a height that is located between a height of 100 mm above a bottom end of a conductive element to a height of 100 mm below the bottom end of a conductive element.

34. The downhole tool according to claim 1, wherein the downhole tool is provided with power by way of one of, a wire coupled to a surface power source or a downhole battery or a downhole power generator.

35. The downhole tool according to claim 1, wherein the one or more non-conductive spacers are placed at an angle with respect to a longitudinal axis of the tool.

36. A downhole tool for removing sections of metal tubing, said downhole tool comprising:
 one or more conductive elements arranged to corrode a section of metal tubing using an electrolytic process, said one or more conductive elements being formed of electrically conductive material,
 an apparatus to establish a connection between the one or more conductive elements and the metal tubing,
 a power unit configured to provide an electrical current to the one or more conductive elements, wherein the power unit is configured to convert a low current/high voltage input from a power source into a high current/low voltage output for provision to the conductive elements and the tool comprises a device configured to obtain measurements of the current output from the power unit, and the measurements are usable to monitor the corrosion of the metal tubing.

37. A downhole tool for removing sections of metal tubing, said downhole tool comprising:
one or more conductive elements arranged to corrode a section of metal tubing using an electrolytic process, said one or more conductive elements being formed of electrically conductive material,
an apparatus to establish a connection between the one or more conductive elements and the metal tubing,
a power unit configured to provide an electrical current to the one or more conductive elements,
wherein the tool further comprises at least one apparatus to provide vibration to the conductive element.

* * * * *